United States Patent [19]

Katayama et al.

[11] Patent Number: 5,965,191
[45] Date of Patent: *Oct. 12, 1999

[54] PROCESSED FISH FLESH, FISH FLESH MATERIAL USING THE SAME AND METHOD OF PREPARING PROCESSED FISH FLESH

[75] Inventors: Hiroshi Katayama; Taro Katayama, both of Kitakyushu, Japan

[73] Assignee: Kabushiki Kaisha Katayama, Fukuoka-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/849,615

[22] PCT Filed: Feb. 29, 1996

[86] PCT No.: PCT/JP96/00477

§ 371 Date: Jun. 4, 1997

§ 102(e) Date: Jun. 4, 1997

[87] PCT Pub. No.: WO96/27300

PCT Pub. Date: Sep. 12, 1996

[30] Foreign Application Priority Data

Mar. 6, 1995 [JP] Japan .................................. 7-074613

[51] Int. Cl.$^6$ .............................. A23L 1/325; A23L 1/33; A23B 4/02
[52] U.S. Cl. ......................... 426/643; 426/92; 426/293; 426/296; 426/310; 426/323; 426/654
[58] Field of Search ............................. 426/643, 92, 293, 426/296, 310, 323, 654

[56] References Cited

U.S. PATENT DOCUMENTS

| | | | |
|---|---|---|---|
| 3,036,923 | 5/1962 | Mahon | 99/195 |
| 4,303,685 | 12/1981 | Katoh et al. | 426/332 |
| 4,517,208 | 5/1985 | Crawford | 426/332 |
| 4,871,560 | 10/1989 | Brokans | 426/643 |
| 4,937,092 | 6/1990 | Brutsky et al. | 426/643 |
| 4,971,822 | 11/1990 | Michel et al. | 426/643 |
| 4,992,295 | 2/1991 | Ueno et al. | 426/643 |
| 5,256,433 | 10/1993 | Nakamura et al. | 426/289 |
| 5,523,102 | 6/1996 | Morasch | 426/643 |

FOREIGN PATENT DOCUMENTS

| | | |
|---|---|---|
| 16890 | 8/1909 | Japan . |
| 50-25755 | 3/1975 | Japan . |
| 56-8640 | 1/1981 | Japan . |
| 56-15671 | 2/1981 | Japan . |
| 63-74470 | 4/1988 | Japan . |
| 63-226259 | 9/1988 | Japan . |
| 1-181767 | 7/1989 | Japan . |
| 2-39845 | 2/1990 | Japan . |

*Primary Examiner*—Helen Pratt
*Attorney, Agent, or Firm*—Lane, Aitken & McCann, L.L.P.

[57] ABSTRACT

The present invention has, as its object, a processed fish flesh having a high yield and a high nutritious value, showing a powerful heat binding characteristic and a resiliency, having a versatile processing, preventing a denaturation loss, capable of eliminating almost of all flowing-out of drip such as a low molecular nutritious substance and utilizing these features effectively. The processed fish flesh of the present invention has a configuration including salt of 0.2 to 4 weight parts in its dry weight added in a form of solution in 1.5 to 7 mol concentration dissolved in water or drip, and alkali agent of 0.1 to 2.7 weight parts in its dry weight added in a form of solution in 0.3 to 3 mol concentration dissolved in water or drip.

17 Claims, No Drawings

PROCESSED FISH FLESH, FISH FLESH MATERIAL USING THE SAME AND METHOD OF PREPARING PROCESSED FISH FLESH

TECHNICAL FIELD

This invention relates to a processed fish flesh having round or meat block-like fish flesh or fine cut fish flesh processed, a fish flesh material using the same and a method of preparing processed fish flesh. More particularly, this invention relates to a processed fish flesh, a fish flesh material using the same and a method of preparing processed fish flesh in which drips of fish flesh are prevented from being discharged during thawing or refrigerating operation, the cell membranes in skeletal muscles, the perimysium, collagen or the myofibril of fish flesh block or lipid or fat or cell membranes tissue or collagen in fat are solved with salt by impregnating a small amount of high concentration solution of salt or high concentration solution of alkali in the fish flesh block, emulsification is promoted with high concentration solution of alkali, gelation capability is added, denaturation caused by softening flesh fiber or fat, gelatin formation or oxidation of fish flesh block or the like is prevented, the drips during thawing or refrigerating operation are prevented from being discharged, taste or flesh color of the denatured fish flesh is reproduced and recovered.

BACKGROUND ART

In recent years, the fishery products have been improved as superior protein foods and in particular they have been evaluated as superior food materials in view of health of a person. As the processed foods of the fishery product, a fish-paste product such as boiled fish paste has been widely known and frozen ground fish has been frequently used as its raw material.

However, due to the fact that there were many kinds of fishery products, flesh tastes were substantially different from each other in view of age, sex, seasons and nutritive conditions or the like and in particular, the muscles of the fishery products contained 70 to 80% moisture therein, deteriorations in quality such as reduction in weight, flesh collapse, hardening or oxidation of flesh tissue or the like caused by discharging of drips of the fishery product in the case that the fishery products were processed (frozen, refrigerated, stored with salt and heating or the like) have become a problem.

In view of this fact, as means for improving these prior art problems, various kinds of processing methods have been proposed.

1. In the gazette of Japanese Patent Laid-Open No. Sho 53-50358 is disclosed a processed food manufacturing method in which salt is added to fine flesh and plant albumin to form paste and then oil and fat and heat solidifying raw material are non-uniformly mixed from each other and they are gradually frozen.

2. In the gazette of Japanese Patent Laid-Open No. Sho 54-2368 is disclosed a smoked and processed fish flesh product in which a step for getting a bonito pickled in sorbitol liquid of $NaHCO_3$ and $NaHPO_4$ and a step for sprinkling with salt are concurrently carried out or almost simultaneously to soften the flesh quality or stabilize flesh pigment tissue.

3. In the gazette of Japanese Patent Laid-Open No. Sho 55-144844 is disclosed a fishery frozen food manufacturing method in which a fish flesh with bones is pickled in solution of salt, sodium bicarbonate, alkaline phosphate, dehydrated and the flesh is pressurized, heated and then frozen.

4. In the gazette of Japanese Patent Laid-Open No. Sho 57-5668 is disclosed a fish flesh ham manufacturing method in which a fish flesh is pickled in solution of sodium hydrogencarbonate of 0.3 to 1.0% and sorbitol of 0.3 to 1.0% or their mixed solution, dehydrated, and after this dehydration, the flesh is pickled in salt solution, and processed with casing to improve a fish flesh binding state.

5. In the gazette of Japanese Patent Laid-Open No. Sho 62-19069 is disclosed an edible protein raw material manufacturing method in which soft tissue of a walleye pollack bleached with water is pickled in mixture liquid of edible oil or salt or saccharide for a longer hour so as to improve its state, and gradually frozen.

6. In the gazette of Japanese Patent Laid-Open No. Hei 6-165634 is disclosed a processed marine product pre-processing method in which inorganic salt is dissolved in aqueous solution of sodium chloride acting as pre-processing agent, sodium carbonate is added to keep a value of pH of entire aqueous solution in alkaline state, the marine product is pickled in the pre-processing liquid for a longer hour and kept at 0 to 20° C., boiled and thawed in order to keep deterioration in quality caused by processing of the marine product at a minimum value.

7. In the gazette of Japanese Patent Laid-Open No. Sho 62-49012 is disclosed a shark flesh frozen cut tissue manufacturing method in which the shark cut tissue is added directly with saccharide, polymerization phosphate (6 to 12 weight parts, polymerization phosphate of 0.05 to 0.4 weight parts and dimetallic salt (0.2 to 1.0 weight parts) without bleaching with water, then sufficiently agitated by an agitating machine, frozen at $-40°$ C. and occurrence of bad odor during processing is prevented.

8. In the gazette of Japanese Patent Laid-Open No. Sho 53-145948 is disclosed a manufacturing method in which a whale flesh is cut into a desired thickness, washed with water, salt of 1 to 3% is added to the flesh, salt soluble protein only at the surface of the flesh is dissolved by an agitating and mixing machine without damaging its inner tissue, the flesh is molded under a reduced pressure of 70 mmHg, then heated in hot water of 90° C. for 2 hours and 30 minutes, the flesh is cut into a proper shape and canned with whale blocks.

9. In the gazette of Japanese Patent Laid-Open No. Hei 4-311374 is disclosed a method in which fish with deteriorated freshness and fish with soft flesh tissue are added with quality improving agent of calcium chloride or salt after its bleaching with water or its preliminary dehydration so as to make a resilient fish flesh.

10. In the gazette of Japanese Patent Laid-Open No. Sho 62-130667 is disclosed a frozen ground flesh in which sodium carbonate (0.04 to 0.06%) and/or sodium hydrogencarbonate 0.05 to 0.15% is added during pickling at the ground flesh manufacturing stage and its value of pH is adjusted to 7.5 or less.

11. In the gazette of Japanese Patent Laid-Open No. Hei 2-295466 is disclosed a resilient paste product manufacturing method in which basic calcium of 0.01 to 0.1 weight parts is added to get a value of pH of 7.3 to 8.5 and animal and plant proteins of 0.5 to 5 weight parts is added during manufacturing of fish paste product.

12. In the gazette of Japanese Patent Laid-Open No. Hei 2-203769 is disclosed a fish paste product manufacturing method in which calcium salt, magnesium salt and strontium salt are applied during bleaching with water to prevent a flowing-out of a protein cross-linking factor and adding of phosphate enables its to be increased.

13. In the gazette of Japanese Patent Laid-Open No. Hei 1-222761 is disclosed a method in which a fish flesh is finely divided into powder by a homoginizer in phosphate (0.2% or less) or sodium bicarbonate solution at the stage of bleaching with water, the flesh is bleached with water for 20 minutes under a reduced pressure by 100 mmHg so as to improve a gelation forming capability.

14. In the gazette of Japanese Patent Laid-Open No. Sho 54-80456 is disclosed a corn beef manufacturing method in which a raw material meat of block form is scarred, thereafter phosphate compounding agent and adding agent such as salt are added, the meat is agitated and mixed under a reduced pressure of 60 cmHg or more to perform a pickling operation, and a manufacturing yield is improved by 15 to 20%.

15. In the gazette of Japanese Patent Laid-Open No. Sho 59-39111 is disclosed a chicken block manufacturing method in which salt of 1 to 3% is added to a chicken, a gradual agitation and mixing is applied to the chicken, salt soluble protein of meat-paste like form is dissolved out at the surface of the meat block, the meat is fed into a mold under a reduced pressure and filled in it, the meat is further heated and solidified.

16. In the gazette of Japanese Patent Laid-Open No. Sho 62-29953 is disclosed a meat processed product manufacturing method in which pickle liquid heated with water vapour is injected into meat to get meat processed product having a low salt amount, low calorie and low phosphoric acid.

17. In the gazette of Japanese Patent Laid-Open No. Hei 3-180138 is disclosed a seasoned meat manufacturing method in which proper amounts of saccharide, binding agent, coloring auxiliary agent, emulsion stabilizer agent, pH adjusting agent or the like as well as a major substance of ground salt and a raw material meat is immersed for 10 to 30 hours in a large amount of pickle solution having a composition of which concentration is approximately equal to that of body liquid.

18. In the gazette of Japanese Patent Laid-Open No. Sho 58-37826 is disclosed a sheet-of-meat block manufacturing method in which sodium salt is added to a meat block, ion intensity at the surface of the meat block is adjusted to 0.6 or more, actomyosin is dissolved at the surface of the meat block, frozen at −2 to −8° C., thereafter molded under a pressure of 3 to 70 kg/cm$^2$ and the meat blocks are contacted from each other.

19. In the gazette of Japanese Patent Laid-Open No. Hei 2-308774 is disclosed a method of reforming small pieces of meat in which paste meat having the myofibril protein dissolution agent such as salt added to small pieces of meat with 10 to 90 weight parts to have a pH value of 6.0 to 7.3 and mixture meat having residual small pieces of meat with 90 to 10 weight parts to have a pH value of 6.5 or less are kneaded to each other under application of a vacuum agitator, a line mill and a liner mixer while avoiding mixing of oxygen gas.

However, each of the aforesaid prior art processing methods had the following problems.

(1) The method disclosed in Japanese Patent Laid-Open No. Sho 53-50358 is operated such that plant protein and salt are added to fine meat, crushed to each other to make paste-like meat, fat is blended with the paste and thereafter a gradual freezing is carried out for 5 hours to several days to make an alternative product for roast ham and the like. However, this method had a problem that a product temperature was increased due to friction during crushing operation, its quality could easily be deteriorated, and a cooling operation or the like was required to prevent the product temperature from being increased and its poor working characteristic was resulted. In addition, this method had a problem that a bonding feature of fish flesh was reduced due to an easy discharging of drip under activation of enzyme, the bonding characteristic of the fish flesh was reduced due to adsorption of drip with flesh paste, plant protein was required to accommodate for it to deteriorate taste of the flesh. Accordingly, this method had a problem that the fish flesh could not be made of full fish, manufacturing also required longer hours, various problems were found in view of quality as well as sanitation and further it had a low productivity.

(2) The method disclosed in Japanese Patent Laid-Open No. Sho 54-2368 had a problem that blood of fish flesh such as a bonito which was easily hardened and changed in color to charcoal after cooking was removed with salt water, salt was sprinkled over it for pickling it for 48 hours, then the flesh was pickled in bicarbonate soda, secondary phosphate soda and sorbitol liquid to soften the tissue quality, although a large amount of salt were sprinkled over the surface of the tissue, resulting in that the tissue was bitter, a salt pickling stage required longer hours, fine elements of low molecular weight such as water soluble protein was dissolved and discharged out, its yield was reduced, a poor productivity occurred and a concentration of salt was high. In addition, it had a problem that its taste was deteriorated and a pickling stage required longer hours, resulting in that its productivity was poor.

(3) Although the method disclosed in Japanese Patent Laid-Open No. Sho 55-144844 enabled fish flesh to be eaten together with bones and showed a superior taking of calcium, it had a problem that its working during manufacturing was troublesome, showed a poor workability and had a poor productivity. In addition, this method had a problem that it had pressurizing and heating stages, nutritious substances were damaged and nutrition of fish could not be fully utilized.

(4) Although the method disclosed in Japanese Patent Laid-Open No. Sho 57-5668 was preferable for improving binding feature of fish flesh ham, it had a problem that quality of fish flesh might easily be deteriorated due to a long pickling time. In addition, it had a problem that a temperature controlling operation was troublesome due to restriction on deterioration of quality and it had a poor productivity. In addition, it had a problem that water soluble protein as well as taste substance of low molecule or effective nutritious substance and the like were dissolved and discharged out.

(5) Although the method disclosed in Japanese Patent Laid-Open No. Sho 62-19069 was preferable to improve fish flesh such as a walleye pollack having soft tissue or dry and crumbling taste, it had a problem that effective nutritious substances such as fat or low molecular protein substance were discharged into mixture liquid of edible oil or salt or saccharide by an osmotic pressure, the fish flesh was lack in nutritious value and lack in binding feature, and also its processing characteristic was lack.

(6) Although the method disclosed in Japanese Patent Laid-Open No. Hei 6-165634 had an effect to restrict deterioration in quality associated with a processing of marine products, it had a problem that its pickling operation required a longer time and was lack in productivity. In addition, it had a problem that drip of taste substances or the like was dissolved into the processing liquid during a pickling of longer time by osmotic pressure or deterioration in quality was generated during pickling operation.

(7) Although the method disclosed in Japanese Patent Laid-Open No. Sho 62-49012 was preferable for processing sharks containing urea, trimetyleamioxide of about 10 to 20 times of that of normal fish and producing bad odor of ammonia and trimetylamine as a degree of freshness of sharks was decreased, it had a problem that quality might easily be deteriorated during rubbing with salt due to requiring of a step of rubbing with salt and inclusion of solid salt, and further its work was troublesome and lacked in productivity.

(8) The method disclosed in Japanese Patent Laid-Open No. Sho 53-145948 had a problem that after the flesh was bleached with water and its blood was removed, salt was added to the flesh and they were agitated, molded under a reduced pressure, it showed a low productivity due to complex production step, its taste substance was flowed out and then the flesh was lack in its nutritious value and the like.

(9) Although the methods disclosed in Japanese Patent Laid-Open Nos. Hei 4-311374, Sho 62-130667 and Hei 2-203769 were preferable for improving quality of fish having soft flesh tissue, they had a problem that when denatured portions of the myofibril protein were removed by adding salt during bleaching with water or strengthening of tissue was improved by increasing the number of times of bleaching with water or processing time, nutritious substance of low molecule was discharged out under the bleaching with water to cause its taste to be lack and also a product yield was decreased.

(10) Although the method disclosed in Japanese Patent Laid-Open No. Hei 2-295446 showed superior resiliency, texture or odor and the like, it had a problem in view of reaction time and resiliency when basic calcium, in particular, burned calcium was added, and its preservation under a high pH value.

(11) The method disclosed in Japanese Patent Laid-Open No. Hei 1-222761 is carried out such that a cut tissue is divided into fine pieces by a homogenizer in bleaching water (added with phosphate or tripoti acid chloride of 0.2% or sodium bicarbonate) and a pressure reduced bleaching at 100 mmHg is performed. Although fat were removed upon completion of the pressure reduced bleaching operation, this method had a problem of reduction in yield or reduction in productivity caused by complex production steps due to discharging of low molecular nutritious substance caused by bleaching with water, fine piece formation within the bleaching water or reduced pressure bleaching.

(12) The method disclosed in Japanese Patent Laid-Open No. Sho 54-80456 is carried out such that after the muscle membrane or the tendon of flesh pieces is cut into short pieces, additive agent is added to the pieces, the pieces are agitated under a reduced pressure condition, then they are pickled for 48 hours at 3 to 5° C., boiled with vapour for 60 to 90 minutes at 115 to 118° C., the processed flesh is untangled, the muscle membrane, tendon and blood vessel are removed to produce a product. Thus, this method had a problem of lack in productivity due to a complex working steps and longer working hours. In addition, it had a problem that the flesh showed a bad color as a corn beef and it was not preferable in view of safety and sanitation due to adding of phosphate, sodium nitrite and the like.

(13) The method disclosed in Japanese Patent Laid-Open No. Sho 59-39111 had a problem that the reaction was performed only at the surface of the flesh and quality of inner part in the flesh could not be improved. In addition, it had a problem that the processing step became a complex processing step due to requiring a molding operation of 12 to 48 hours under the pressure reduced state and a heating operation of 2 to 3 hours, its cost was highly expensive and it was lack in mass productivity.

(14) It was found that the method disclosed in Japanese Patent Laid-Open No. Sho 62-29953 or Hei 3-180138 showed that an effect of salt solution was poor due to a low concentration of salt and a flesh tissue quality improvement could not be carried out due to a quite slow gelation and emulsification. In addition, this method had a problem that the product was lack in texture such as resiliency or resistance to the teeth and further it had a problem that the flesh was easily oxidized and its color was easily faded. In addition, it had another problem that its quality was dispersed and a flesh block had bad color. Further, it had a problem that it was difficult to improve a layer of fat, flesh having a large amount of fat was easily dispersed in quality and had a poor productivity.

(15) The method disclosed in Japanese Patent Laid-Open No. Sho 58-37826 or Hei 2-308774 had a problem that it had a poor binding characteristic and the flesh was easily collapsed during heating operation due to the fact that elution reaction or bio-chemical reaction of actomyosin was not generated under the presence of the layer of fat in the flesh block. Due to this fact, there was a problem that a full utilization of waste flesh having a large amount of layers of fat was difficult and its workability was lack.

In addition, all these prior arts were processing methods in which the granular additives were sprinkled or the flesh was fully dipped in a large volume of processing and treating solution of low concentration, so that these methods had a problem that it required a longer hour working time to attain the intended object through these processing methods, reduction in quality of fish flesh (softening or hardening, oxidation) was produced and the yield was remarkably reduced. Due to this fact, these prior art methods had a problem that the texture or taste such as resistance to the teeth when the fish flesh was eaten was reduced. In addition, they had a problem that they required a wasting facility for processing a large amount of pickling liquid used for the pickling operation or fat or low molecular nutritious substances discharged out of fish flesh. Further, the prior art processing methods had a problem that they had no universal processing of fish flesh, but they could be utilized only in the specified application.

DISCLOSURE OF INVENTION

The present invention solves the aforesaid prior art problems, wherein the fish flesh can be easily cooked by an electrical cooking device such as a micro-wave oven or the like, no flesh collapsing occurs during heating operation, low molecular nutritious substance is not discharged out, taste is kept in the flesh and the flesh can be utilized in a quite fresh state by a method in which a small amount of salt and alkaline agent of high concentration are mainly added and the fish flesh is processed in a quite short time. In addition, a changing in flesh color caused by oxidation during its refrigeration is quite less and so the flesh color can be vividly realized. Changing in flesh quality or discharging of drip caused by a thawing operation can be prevented, denaturation of the flesh during refrigeration and freezing can be prevented, and a fish-like smell of the marine products can be deodored. It is possible to manufacture a cooked food or a frozen food in which protein, fat or wax-like component in fat in the flesh tissue are changed into gelation or emulsion in their quality, the flesh is stabilized to improve a resistance to the teeth, agreeable to the taste and directed to the healthy condition. The flesh quality can be made soft and the flesh or flesh with fat can be combined under their raw state without requiring various kinds of binding agents or additive agents. The present invention has as its objects to provide a processed fish flesh of high yield and high nutritious value in which a powerful heating and binding characteristic as well as resiliency are indicated, its processing can be easily carried out, a denaturation loss can be prevented, a discharging of low molecular nutritious substance or the like such as drip can be almost null and these effects are effectively utilized; to provide fish flesh materials which are suitable for sliced raw fish for an uncooked eating, canned foods, salty dried foods, roastings such as spit-roastings and other various kinds of processed foods; to provide a fish flesh in which a small amount of salt of high concentration, alkaline agent and vitamin agents or the like as required are added, cell membranes, myofibril, perymisium, collagen, lipid, fat, cell membranes and collagen in fat, or tissues of skeletal muscles or fat are relaxed by a processing of quite short period of time (1 to 15 minutes) or dissolved with salt to be changed into a structure of fine net state and taste can be pulled out of the cellular level and concurrently various kinds of seasoning materials and the like can be added to make a complex taste, the taste can be more continuously enjoyed the more the flesh is chewed even eating it after various kinds of cooking such as uncooked eating of sliced raw fish or heating and cooking are carried out; to provide the most preferable product which can be cooked conveniently with an electrical cooking device such as a micro-wave oven or the like, a low molecular nutritious substance is not discharged during a heating operation, taste can be kept in the flesh and the flesh can be vividly utilized; to prevent as fading in color of flesh caused by oxidation of fish flesh during its refrigeration, realize a vivid color of flesh and prevent discharging of drip caused by thawing or denaturation of the flesh during its refrigeration and freezing or the like; to provide a method of preparing processed fish flesh capable of making the processed fish flesh in mass-production at a low cost in which a fish-like smell of the marine product can be deodorized or processed in masking, protein, oil and fat, and wax-like substances in fat in the tissue of flesh are improved through gelation or emulsion to stabilize the flesh, a resistance to the teeth can be improved, the flesh tissue can be improved at the cellular level, flesh collapsing can be prevented during heating and cooking or the like, adjust a degree of softness of the fish flesh can be freely adjusted and a fresh processed fish flesh of low salt or frozen foods or cooked foods can be manufactured.

In order to attain the objects described above, the present invention comprises the following configuration.

The processed fish flesh in claim 1 has a configuration in which 100 weight parts of a round or block-like fish flesh or fine cut pieces of fish flesh contains (1) salts of 0.2 to 4 weight parts with a dried weight in which either one kind of NaCl, KCl, $CaCl_2$ and $MgCl_2$ or mixture of these elements is dissolved in water or drip of raw material fish fleshs or other fish fleshes, or mixture liquid of the drip and water and added in a solution state in 1.5 to 7.0 mol concentration, and (2) alkaline agents of 0.1 to 2.7 weight parts in which either one of $NaHCO_3$, $Na_2CO_3$, $KHCO_3$, $K_2CO_3$, $NH_4HCO_3$, monosodium phosphate, disodium phosphate, trisodium phosphate, sodium pyrophosphate, sodium polyphosphate, potassium pyrophosphate, sodium hexametaphosphate, potassium metaphosphate and sodium metaphosphate or mixture of these elements is dissolved in water or drip of raw fish flesh or other fish fleshes or mixture liquid of the drip and water and added in solution of 0.3 to 3.0 mol concentration.

The processed fish flesh described in claim 2 has a configuration in which, as additive agent in claim 1, one kind of or more of alcohols of 0.5 to 12 weight parts, vitamin E of 0.001 to 0.2 weight parts, vitamin C of 0.006 to 0.3 weight parts, saccharide of 1 to 13 weight parts, albumen of 0.2 to 5 weight parts and antioxidant of 0.001 to 4 weight parts, preferably 0.01 to 3 weight parts are contained.

The processed fish flesh in claim 3 has a configuration wherein, as described in claims 1 or 2, the drip of raw material fish flesh is reduced into the round or block-like fish flesh or fine cut fish flesh.

The processed fish flesh in claim 4 has a configuration wherein the processed fish flesh of claims 1 to 3 is mixed with at least one kind of:

bond reinforcing agents such as soybean protein powder, dextrin and casein soda and the like;

emulsifying agents such as alubmen, lecithin, suger ester and the like;

functional agents such as DHA, EPA, chitosan, calcium, vitamins, collagen and the like;

adhesion reinforcing agents such as sodium alginate, calcium citrate, corn starch, potato starch powder, glucomannan and the like;

preservation agents such as sorbic acid, potassium sorbate and the like;

plant fibers such as soy bean protein fiber and the like, animal fibers such as chitin and the like, animal and plant fat such as cocoanut oil, corn oil, rape oil, lard and fish oil and the like, seasoning such as glycine, L-glutamic acid, sodium L-glutamate, sodium inosinate, disodium guanylate, fish peptide, beef powder, beef extract, pork extract and the like; and spices such as pepper, ginger, paprika, nutmeg, mace, thyme, allspice, onion, garlic, coriandar, cardamom, caraway, sage, laurel, marjoram, clove, cinnamon and the like.

The method of preparing processed fish flesh in claim 5 has a configuration which comprises a salt dissolution step wherein 3 to 12 weight parts of high concentration solution of salt in 1.5 to 7.0 mol concentration (salt of 0.2 to 4 weight parts in its dry weight) is immersed in 100 weight parts of fish flesh of round or block-like fish flesh or fine cut fish flesh, and cell membranes, myofibril, perimysium, collagen, lipid, fat, and cell membranes and collagen in fat and the like are dissolved in salt; and then an alkaline impregnation step for impregnating high concentration solution of alkali of 1 to 10 weight parts (alkaline agent of 0.1 to 2.7 weight parts in its dry weight) in 0.3 to 3.0 mol concentration.

The method of preparing processed fish flesh in claim 6 has a configuration which comprises an alkaline impregnation step for impregnating high concentration solution of alkali of 1 to 10 weight parts (alkaline agent of 0.1 to 2.7 weight parts in its dry weight) in 0.3 to 3.0 mol concentration to 100 weight parts of round or block-like fish flesh or fine cut fish flesh; and then a salt dissolution step in which 3 to 12 weight parts of high concentration solution of salt in 1.5 to 7.0 mol concentration (salt of 0.2 to 4 weight parts in its dry weight) is impregnated in the fish flesh, and cell membranes, the myofibril, the perimysium, collagen or lipid, fat, and cell membranes and collagen in fat are dissolved in salt.

The method of preparing processed fish flesh in claim 7 has a configuration which comprises a salt and an alkaline impregnation step for impregnating salt and alkaline blended solution containing high concentration solution of alkali of 1 to 10 weight parts (alkaline agent of 0.1 to 2.7 weight parts in its dry weight) in 0.3 to 3.0 mol concentration and salt agent high concentration solution of 3 to 12 weight parts (salt of 0.2 to 4 weight parts in its dry weight) in 1.5 to 7.0 mol concentration to 100 weight parts of round or block-like fish flesh or fine cut fish flesh.

The method of preparing processed fish flesh described in claim 8 is characterized in that the additive agent solution impregnating step for impregnating in the fish flesh the additive agent solution having at least one of saccharide, vitamins, animal and plant proteins powder and antioxidant in any one of claims 5 to 7.

The method of preparing processed fish flesh described in claim 9 has a configuration which comprises a salt dissolution step in which 3 to 12 weight parts of high concentration solution in salt in 1.5 to 7.0 mol concentration (salt of 0.2 to 4 weight parts in its dry weight) is impregnated in the fish flesh, and cell membranes, myofibril, perimysium, collagen, lipid, fat, cell membranes and collagen in fat and the like are dissolved in salt in 1.5 to 7.0 mol concentration to 100 weight parts of round or block-like fish flesh or fine cut fish flesh; and an alkaline and additive agent impregnation step for impregnating blended solution containing high concentration solution of alkali of 1 to 10 weight parts (alkaline agent of 0.1 to 2.7 weight parts in its dry weight) in 0.3 to 3.0 mol concentration and additive agent solution which blends with at least one of saccharide, vitamins, animal and plant proteins powder and antioxidant.

The method of preparing processed fish flesh described in claim 10 has a configuration which comprises an alkaline and additive agent impregnation step for impregnating additive agent solution mixed with high concentration solution of alkali of 1 to 10 weight parts (alkaline agent of 0.1 to 2.7 weight parts in its dry weight) in 0.3 to 3.0 mol concentration and at least one of saccharide, vitamins, animal and plant proteins powder and antioxidant in 100 weight parts of round or block-like fish flesh or fine cut fish flesh; then a salt dissolution step in which 3 to 12 weight parts of high concentration solution of salt in 1.5 to 7.0 mol concentration (salt of 0.2 to 4 weight parts in its dry weight) is impregnated in the fish flesh, and cell membranes, myofibril, perimysium, collagen, lipid, fat, cell membranes and collagen and the like in fat are dissolved in salt.

The method of preparing processed fish flesh described in claim 11 has a configuration which comprises a dispersion and absorption step for impregnating and dispersing in the fish flesh high concentration solution of salt or high concentration solution of alkali, additive agent solution after the salt impregnation step or salt and alkaline impregnation step or after the alkaline impregnation step or additive agent impregnation step in any one of claims 5 to 10.

The method of preparing processed fish flesh described in claim 12 has a configuration wherein the high concentration solution of salt in any one of claims 5 to 11 is solution composed of one of NaCl, KCl, CaCl$_2$ and MgCl$_2$ or mixture of these elements and dissolved in water or drip of raw material fish flesh or other fish fleshes or mixture liquid of drip and material.

The method of preparing processed fish flesh described in claim 13 has a configuration wherein high concentration solution of alkali in any one of claims 5 to 11 is solution composed of mixture of either one or two or more of NaHCO$_3$, Na$_2$CO$_3$, KHCO$_3$, K$_2$CO$_3$, NH$_4$HCO$_3$, monosodium phosphate, disodium phosphate, trisodium phosphate, sodium pyrophosphate, sodium polyphosphate, potassium pyrophosphate, sodium hexametaphosphate, potassium metaphosphate and sodium metaphosphate and dissolved in water or drip of raw fish flesh or other fish fleshes or mixture liquid of the drip and water.

The method of preparing processed fish flesh described in claim 14 has a configuration wherein the salt dissolution step or alkaline impregnation step, salt and alkali impregnating step and dispersion and absorption step in any one of claims 5 to 11 are carried out under a fish flesh processing temperature of 20° C. or less, preferably 10° C. or less and/or under a pH value of 5 to 10, preferably 6.5 to 8.5.

The method of preparing processed fish flesh described in claim 15 has a configuration wherein the salt dissolution step or alkaline impregnation step, salt and alkaline impregnating step in any one of claims 5 to 11 are one of an injection process for directly feeding into the fish flesh through injection or an atomization process for performing a direct atomization against the surface of the fish flesh.

The method of preparing processed fish flesh described in claim 16 has a configuration wherein the dispersion and absorbing step in any one of claims 5 to 11 is any one of a massage process, a vibration process, a ultrasonic wave process and a kneading process.

As the kind of fishes described herein are of marine and freshwater fishes and they may be utilized whatever sizes and shapes may be applied. For example, white flesh fishes such as walleye pollacks, Hokis. silver salmons, sea breams or the like; red flesh fishes such as tunas, swordfishes or the like; blue skin fishes such as sardins, mackerels, horse mackerels, and mackerel pikes or the like; marine fishes such as marine animals of seals, whales or the like; fresh water fishes such as carps, crucians, duckweed fishes or the like; mollusks such as eels, pike congers, hairtails, octpuses, cuttlefishes or the like; krills such as the Antarctic krills, mysids or the like may be utilized.

As fish fleshes, fishes just after being caught, or refrigerated fishes, frozen fishes and fishes stored at icy temperature or the like may be utilized. In particular, salmons, trout, codfish after their salmon roe, or trout roe, or cod roe are removed, or red flesh fishes having less fat or other kinds of fishes of low utilization level may also be utilized, and concurrently fish fleshes of which freshness degree is deteriorated may also be utilized.

As the forms of fish fleshes, there may be provided round (sardins, mackerels, horse mackerels, oceanic bonitos, cuttlefishes, an Atka mackerel, sea breams), semi-dress (salmons, trout, tunas, sharks, rainbow trout or the like), dress (salmons, trout, codfish, shrimp or the like), pan-dress (salmons, trout, tunas, halibuts or the like), chank (broadbill, tunas or the like), fillet (broadbill, a flatfish, a walleye pollack, tunas, halibuts, a dorado or the like), steak (salmons, trout, broadbill, tunas, whales, halibuts or the like), block (whales, a walleye pollack, an Atka mackerel or the like), slices, small cubes, fine cut meats, ground meats, cut pieces, and sticks or the like.

The fish fleshes having thick flesh pieces are preferable due to the fact that injection operation of impregnating work for impregnating high concentration solution of salt or high concentration solution of alkali into fish flesh blocks can be easily carried out and also a massage work, a vibration work and a ultrasonic wave work or the like can be easily carried out. In addition, small-sized fleshes such as fine cut fish fleshes or crustaceans or krills and fleshes cut pieces can be uniformly impregnated through atomization of high concentration solution of salt or high concentration solution of alkali.

Although a concentration is differed in reference to the type of salt, as high concentration solution of salt, solution having 1.5 to 7.0 mol concentration, preferably 2.5 to 6.0 mol concentration is used. Although a salt concentration is differed in reference to a sampling location in the fish flesh as well as the type of fish, it is acknowledged that in general, a degree of dissolution of the myofibril is decreased as the concentration becomes lower than 2.5 mol concentration and a production of gelatin in the fish flesh is apt to be decreased, and in particular if the value is lower than 1.5 mol concentration, its tendency becomes remarkable and in turn as the value exceeds 6.0 mol concentration, salty taste becomes high and flesh quality becomes hard, resulting in that taste of the flesh is deteriorated and particularly if the value exceeds 7.0 mol concentration, its tendency becomes remarkable, so that both of them are not preferable. This is preferable due to the fact that the salt concentration of 2.5 to 6.0 mol concentration improves a degree of dissolution of cell membranes or myofibril, perimysium, collagen in the fish flesh or lipid, fat, cell membranes or collagen in fat, changes the tissue in the fish flesh into a fine net-like structure, dissolved actomyosin from the flesh protein, applies a gelation capability and improves its binding characteristics.

As the salts, one of NaCl, KCl, $CaCl_2$ and $MgCl_2$ or mixtures of these elements is used. In addition, as NaCl, processed salt or the like processed with soda gultamate may be used. The salt high concentration solution is made such that these salts are dissolved in water or drip of raw material fish flesh or other fish fleshes or mixture liquid of the drip and water and then the solution is adjusted to solution in 1.5 to 7.0 mol concentration.

Amount of salts added to the fish fleshes is set such that 0.2 to 4 weight parts, preferably 0.3 to 3 weight parts and more preferably 0.5 to 2 weight parts in dry weight to 100 weight parts of fish fleshes. It is acknowledged that, as the value is decreased lower than 0.5 weight parts, the dissolution degree of salt for cell membranes or the myofibril, perimysium, or lipid, fat, cell membranes or collagen in fat is decreased, and in particular, it is acknowledged that there is a tendency that the value is remarkably decreased under a value of lower than 0.2 weight parts, salt may act forcedly as the value exceeds 3 weight parts and in particular, as the value exceeds 4 weight parts, adaptability as food is damaged depending on a processing method or the type of processing food material. In addition, as the adding amount of salt is decreased, product realizing flavour and taste of raw material can be obtained and in turn in the case that the adding amount of salt is increased, a preservation of the raw material can be improved under utilization of a form of smoked product or dried product with salt.

High concentration solution of alkali is dependent on the type of alkaline agent and the solution having 0.3 to 3.0 mol concentration, preferably 0.7 to 2.5 mol concentration is used. It is acknowledged that as the concentration is decreased lower than 1.5 mol concentration, there is a tendency that an increasing degree of pH of the flesh is decreased, a gelation forming capability or emulsion forming capability becomes unstable, and in particular if the value is lower than 0.5 mol concentration, its tendency becomes remarkable and as the value exceeds 2.5 mol concentration, the value of pH is apt to be increased too much and this causes the myofibril or perimysium to be excessively denaturated, and correspondingly there is a tendency that denaturation of fish flesh may easily be promoted, the processed product and its quality are hardly maintained and in particular, if the value exceeds 3.0 mol concentration, its tendency becomes remarkable, so that both of them are not preferable.

As the alkaline agents, either one of $Na_2CO_3$, $K_2CO_3$, $CaCO_3$, NaOH, KOH, $Ca(OH)_2$, $NaHCO_3$, $KHCO_3$, $Ca(HCO_3)_2$, $NH_4HCO_3$, disodium phosphate, trisodium phosphate, sodium polyphosphate, sodium metaphosphate, sodium pyrophosphate, monosodium phosphate, potassium pyrophosphate, sodium hexametaphosphate, potassium metaphosphate, monopotassium phosphate, dipotassium phosphate, and sodium triphosphate or mixture of these elements is used. In particular, although $NaHCO_3$ or $KHCO_3$ or the like is slightly hard to be dissolved in water and the like, this material is preferable due to the fact that adjustment for its pH value or the like can be easily carried out and it is safe in food sanitation. High concentration solution of alkali is produced such that the solution is adjusted to get 0.3 to 3.0 mol concentration solution in which these alkaline agents are dissolved in water or drips of raw material fish flesh or other fish fleshes or mixture liquid of the drips and water.

Although an adding amount of alkaline agent is dependent upon an intensity of alkali, it is 0.1 to 2.7 weight parts, preferably 0.3 to 2 weight parts and more preferably 0.4 to 1.3 weight parts in respect to 100 weight parts of fish fleshes in dry weight. In addition, in the case that the value of pH is increased, weak acid such as lactic acid may be added to adjust its value. As this adding value becomes lower than 0.4 weight parts, maturing is not performed sufficiently and gelation forming capability is apt to become unstable; in particular, under a value lower than 0.1 weight parts, its tendency becomes remarkable; as the value exceeds 1.3 weight parts, the pH value in fish flesh is increased too much, resulting in that its preservation is deteriorated, chemical odor is added to the flesh and its denaturation may easily be generated; and in particular, as the value exceeds 2.7 weight parts, its tendency starts to appear remarkably, so that all these values are not preferable.

Any type of drips may be applied if they are fresh drips or drips with controlled quality or drips having a less number of bacteria. The drips may be simply applied as they are or they may be used while being mixed with other kinds of drips or diluted with water or they may be added to and mixed with high concentration solution of salt or high concentration solution of alkali. In this case, drips contain a certain amount of water, so that it is preferable to decrease an amount of water for dissolving salt or alkaline agents. It is possible to utilize flavor and taste of raw material flesh by returning low molecular nutritious substance or taste contained in the drips back into the flesh.

It is preferable that the salt dissolution step or alkaline impregnating step, the salt dissolution and alkaline impregnating step, the salt dissolution promoting, gelation capability applying and emulsion step are carried out in 20° C. or less and preferably 10° C. or less. Although the state of a marine product is dependent upon its degree of mature, a reason for that temperature consists in an acknowledgement that the flesh may easily be denatured as the temperature becomes 10° C. or more and its daily preservation is apt to be decreased. And as to the value of pH, it is preferable that an alkaline degree is adjusted to cause a pH value of flesh fish to show 5 to 10, preferably 6.5 to 8.5. It is confirmed that the fish flesh becomes weak as the value of pH is lower than 6.5, and in particular, in the case that the value of pH is 5 or lower, its tendency becomes remarkable. In addition, as the value of pH exceeds 8.5, it is confirmed that, although the value is dependent upon the type of raw material fish, a rapid stabilizing of the fish flesh is produced and in the case that the value of pH exceeds 10, its tendency becomes remarkable, so that both of them are not preferable.

In the case that salt high concentration solution or alkaline agent high concentration solution is impregnated into the fish flesh through a pouring device of injection or the like, they may be concurrently added. If high concentration solution of salt is poured first, then high concentration solution of alkali is poured, a color tone of the fish flesh can be improved. In addition, in the case that the fish flesh is fresh or its color tone is not a problem at all (for example, the fish flesh is used for a processed fish flesh such as a fish flesh hamburger or a fish flesh croquette), a first pouring of high concentration solution of alkali into the fish flesh enables its physical properties to be improved through emulsion formation in the fish flesh or the like.

The impregnating method is carried out with an injector for performing injection or with an atomizing method for a small-sized fish flesh and in turn in the case that the fish flesh is large in size, the impregnating method is carried out with an injection machine.

As alcohols, cooking sake such as sweet sake (called as "Mirin"), Japanese sake or foreign liquors such as wine or whisky or Chinese sake are preferably used. Adding of cooking sake such as sweet sake or liquors such as Japanese sake enables the processed fish flesh to improve its luster or flavor or a soft-touch feeling.

As an adding amount of alcohols to the fish flesh, 0.5 to 12 weight parts of alcohols, preferably 1 to 8 weight parts of alcohols is used for 100 weight parts of the fish flesh. As the adding amount becomes 1 weight parts or lower, there occurs a tendency that a minute flavor is not generated and in particular, in the case that the value is 0.5 weight parts or lower, that tendency is remarkable, so that it is not preferable. In addition, as the value exceeds 8 weight parts, a tendency in which the flavor contained in the fish flesh is deteriorated and in particular, when the value exceeds 12 weight parts, this tendency becomes remarkable, so that this is not preferable.

As saccharide, it is possible to utilize substance in which glycerin, propyleneglycol, starch or the like are added to one of xylite, sorbitol, glucose, oligosaccharide, melt-tetra-ose, galactose, fructose, lactose, sugar, cane sugar, malt sugar, grape sugar or mixtures of these substances. As an adding amount of saccharide, 1 to 13 weight parts, preferably 4 to 10 weight parts of saccharide is used for 100 weight parts of fish flesh. As the value is decreased lower than 4 weight parts, the fish flesh is easily denatured in freezing during its storing state and flesh quality is apt to be deteriorated, and in turn if the value is lower than 1 weight parts, this tendency becomes remarkable for a certain kind of fish, so that the lower value is not preferable. In turn, as the value is increased more than 10 weight parts, sweet taste is apt to be remarkably added to the fish flesh and its color is changed into charcoal color and in particular, if the value exceeds 13 weight parts, its tendency becomes remarkable, so that this higher value is not preferable.

As vitamin C, 0.006 to 0.3 weight parts, preferably 0.02 to 0.15 weight parts of vitamin C is used for 100 weight parts of the fish flesh. As the value becomes lower than 0.02 weight parts, the fish flesh is apt to be oxidized to deteriorate its color, and in particular, when the value is lower than 0.006 weight parts, this tendency becomes remarkable, so that this lower value is not preferable. In addition, as the value is increased more than 0.15 weight parts, there appears a tendency that a substantial difference is not acknowledged in coloring effect of the fish flesh or antioxidation effect in response to the type of fish flesh or a degree of freshness and in particular, as the value exceeds 0.3 weight parts, its tendency becomes remarkable, so that this increased value is not preferable.

As vitamin E, 0.001 to 0.2 weight parts, preferably 0.005 to 0.08 weight parts of vitamin E is added for 100 weight parts of the fish flesh to enable coloring of fish flesh or antioxidation effect for the fish flesh to be improved together with vitamin C, and in particular, the effect can be made remarkable under the value of 0.005 to 0.08 weight parts. In the case that the fish flesh is fresh, vitamin E may not be used, but only vitamin C may be sufficient.

As albumen, 0.2 to 5 weight parts, preferably 1.2 to 4.5 weight parts is applied for 100 weight parts of fish flesh. Due to this blending rate, even for the fish flesh which was denatured in freezing operation after preservation in frozen state for a long period of time, it is possible to reinforce and promote a salt dissolution characteristic of high concentration solution of salt or emulsion forming or gelation with high concentration solution of alkali and then in particular, the action can be improved more under a value of 1.2 to 4.5 weight parts.

As antioxidant agent, erysorbic acid, disodium ethylenediaminetetraacetic acid calcium, sodium erysorbic acid, Sankatohru (a trade mark of Taiyoh Kagaku Co.,Ltd.) are preferably applied. As a blending amount of the anti-oxidant agent, 0.005 to 4 weight parts, preferably 0.05 to 3 weight parts of the antioxidant agent is used for 100 weight parts of the fish flesh. Within this range, the taste of the fish flesh may not be deteriorated and the color of the fish flesh can be prevented from being changed.

Alcohols, vitamin C, vitamin E, saccharide, albumen and antioxidant agent or the like are dissolved in sorbitol solution which is a certain kind of saccharide or water or a drip of raw material fish flesh or drips of other fish fleshes or mixture liquid of the aforesaid drip and water and used as additive agent solution. In particular, sorbitol solution is preferable. Since particulate sorbitol is hardly dissolved in water or the like, solution type sorbitol (70% concentration) may easily be mixed with high concentration solution of salt and used. Taste of the fish flesh can be extracted more by adding these substances.

As other sub-elements, there may be utilized protein additive agents such as bouillon, meat extract, seasoning agent, spice, lactoalbumin and blood plasma powder or the like; binding agents such as actomyosin, dextrin, Pearl-Meat-Activa TG-B (a trademark of Chiba Seifun Co., Ltd.); binding auxiliary agents such as soy bean protein powder, casein soda, Cardrun 10, 20, 30 (a trademark of Takeda Pharmaceutical Co.,Ltd.); emulsifiers such as lecithin, sugar ester, glycerin fatty acid ester, and fatty acid ester propylene glycol; functional agents such as DHA, EPA, chitosan, calcium, vitamins, and collagen; emulsifiers such as Sanpro LX-100 (a trademark of Taiyo Kagaku Co., Ltd.), Sansoft (a trademark of Taiyo Kagaku Co., Ltd.); tackifier auxiliary agents such as soda alginate, calcium citrate, corn starch, white potato starch, glucomannan; preservation agents such as sorbic acid, potassium sorbitol; plant fiber such as soy bean protein fiber; animal-fiber such as chitin; and animal and plant fat such as coconut oil, corn oil, rape oil, fat of pig, lard, fish oil. These substances can be dissolved in high concentration solution of salt or high concentration solution of alkali or additive agent solution and used.

With such an arrangement as above, it is assumed that a predetermined amount of high concentration solution of salt and a small amount of high concentration solution of alkali are substantially uniformly impregnated in a fish flesh, a high impregnating feature of the cell membranes of the fish flesh is utilized to cause these salt and alkaline agents to be uniformly dispersed and absorbed in the flesh and then a rapid biochemical reaction can be produced within the tissue of the flesh.

It is assumed that if a total amount of the small amount of impregnated high concentration solution of salt is dispersed and absorbed by a physical means, this may act directly against the skeletal muscles or a layer of fat in the fish flesh or the like, so that the salt dissolution is promoted within a quite short period of time, a salt concentration is decreased rapidly to cause its reaction activity to be stabilized and further its quality is stabilized.

Further, it is assumed that since a small amount of high concentration solution of alkali is also dispersed and absorbed in the flesh in the same manner by the physical means, although its reason is not apparent, the biochemical reaction is produced continuously in the fish flesh tissue to cause the myofibril or bundle of muscles to be changed into fine net-like tissue in a quite short period of time and then emulsifying and gelation capability are added. That is, it is assumed that a small amount of salt, alkaline agent, vitamins, functional agents or seasoning agents are included in the fish flesh under a state of the high concentration solution, then they are applied with a forced dispersion and absorption step such as vibration, thereby all these total amounts are absorbed directly into the fish flesh to cause a biochemical reaction to be generated therein, cell membranes, the myofibril, the perimysium, the muscles, lipid, fat, collagen in the skeletal muscles are relaxed, softened and dispersed and further they are partially dissolved, resulting in that taste substance such as peptide is dissoluted and dispersed into the flesh tissue, the substance takes out a complex effect together with other added additive agents or seasoning agents, wherein these dissolved, dispersed and blurred substances have emulsifying and gelation capabilities, they are uniformly combined with the surrounding fish flesh tissue, a certain type of tissue paste formation is generated within the flesh and moisture or the like can be held highly in the flesh tissue. It is possible that collagen or lipid contained in fibers in fat or blood vessel, nerve in the cellular tissue is softened and dissolved in salt at the layer of fat, the layer of fat is denatured into a state having a gelation capability, the fat tissue is denatured and gelatinned and at the same time the taste of the flesh is made remarkable. The flesh tissue is dissolved in salt or alkaline solution, applied with gelation capability, emulsified and its quality is improved, so that an effect of adding vitamin to the skeletal muscles or the like can be remarkably improved, the flesh can be activated to enclose reaction materials or additive agents or the like in the tissue of fine net-like structure, resulting in that oxidation or color fading during preservation of the marine product flesh can be prevented, the flesh can be changed to have a transparent outer appearance, its freshness can be continued and a degree of whiteness of the flesh can be controlled under a combination of additive substances.

Since the salts or alkaline agents are uniformly dispersed in the flesh tissue, the lactic acid generated in the skeletal muscle tissues neutralizes the alkaline agents uniformly dispersed in the flesh tissue to cause a pH value of the fish flesh to be reduced, resulting in that its daily preservation can be remarkably improved and reduction in quality can be prevented.

In addition, high concentration solution of salt and high concentration solution of alkali can be uniformly dispersed by applying massage or vibration or ultrasonic wave processing and then fine net-like structure formation or microsized emulsifying operation and gelation capability application can be promoted within a quite short period of time (1 to 15 minutes). A moisture holding state of flesh can be improved by performing the fine net-like formation of flesh tissue with salt dissolution and emulsifying capability, drip formation can be prevented and raw flesh or the like just after catching the fish product can be matured in a quite short period of time. Since the moisture holding characteristic is improved, it is possible to prevent the taste substance such as water-soluble low molecular protein or various kinds of low molecular nutritious substances from being flowed out and the taste substance or nutritious value included in the fish flesh can be extracted as much as possible and utilized. In addition, only a small amount of high concentration solution of salt is utilized, so that an entire salt concentration in the fish flesh can be restricted to make a low salt contained food. Further, since the flesh can be softened by this processing, a hard low class flesh, for example, a hard flesh such as a flesh of tail part of tuna can be changed into a soft flesh.

Concentration of salt or alkaline agent is changed to enable a binding characteristic or a degree of softness of the flesh to be freely adjusted. In addition, since the drip generated during thawing is mixed in high concentration solution of salt or high concentration solution of alkali and returned back into the fish flesh, it is possible to prevent the nutritious value or taste in the fish flesh from being deteriorated. In addition, it is possible to improve color of the fish flesh and to improve quality under an action of high concentration solution of alkali, high concentration solution of salt and vitamins and further to prevent fish smell from being generated.

The drip is added to other kinds of fish fleshes except the fish flesh generated the drip to enable the taste of other kinds of flesh dew to be added to the taste.

Since water-soluble seasoning agent or nutritious agents or functional agents can be mixed in high concentration solution of salt or high concentration solution of alkali, it is possible to add taste or high nutritious value corresponding to application such as meal for a sick person to the raw material itself.

Since the flesh tissue of the fish flesh is changed to form a fine net-like structure, a so-called gelation forming capability, so as to make a minute flesh tissue, even if flesh dew is generated during heating and roasting operation, the flesh dew is absorbed and held in the tissue when the flesh is expanded through its heating, an amount of inclusion of moisture in the flesh is increased, resulting in that a rate of expansion is improved to get a soft product having a certain volume. Concentration of salt solution or alkali solution is adjusted to enable a hardness or a softness of the fish flesh tissue to be freely adjusted, so that a range of application of cooking can be expanded. In addition, it has a high binding characteristic, so that an interface part between the fleshes may be well connected, several fine cut flesh pieces or the like become one sheet of flesh and even if the flesh is heated, the flesh is not separated into dispersed state. Since the flesh has a high degree of holding water, the flowing-out of the drip caused by freezing operation can be prevented and at the same time its denaturation can be prevented during its refrigeration, freezing or thawing, respectively. In addition, even if a gradual freezing or a re-freezing is carried out, the flesh pieces or several fine cut flesh pieces have a superior binding characteristic, so that no drip occurs and the skeletal muscles or layer of fat can be stabilized at high quality.

Since salts or alkaline agents are added under a high concentration, the layer of fat in the fish flesh is dissolved in salt in a quite short period of time to form emulsion, gelation, gelatin and in addition, the fiber protein, i.e. the cell membranes or the myofibril, the perimysium or the like are loosed and dissolved through adding of salt of 1 weight % or less, although high concentrated solution can be dispersed into the protein or fat in the flesh tissue, reacted there to cause the solution concentration to be gradually decreased and a bio-chemical reaction can be finished in a short period of time. As a result, it is possible to cause a flesh with quality of a poor binding characteristic to be changed into a flesh having a superior resiliency and soft binding characteristic without damaging the skeletal muscle tissue. Although it is assumed that a reason for it may consist in the fact that actomyosin is dissolved and enzyme activity in the raw flesh is prohibited to prevent decay of the flesh tissue, it is possible to get a universal processing characteristic applying a binding feature or a high heating binding feature under a raw flesh state.

It is possible to stabilize the fish flesh tissue in the same manner as that of a paste product under a gelation effect with the salt dissolution effect, to produce a sliced raw fish flesh having a resistance against the teeth, to prevent fat from being dissolved or cell membranes or filaments in the flesh from being untied and dispersed under a high pressure or a heating with micro-wave for a canned or retort food and at the same time to prevent a decay of fish flesh during heating or after heating cooking operation. When the flesh is heated and expanded, it is possible to absorb the discharged flesh dew into the fine net-like flesh tissue and to improve a moisture holding effect. In addition, it is possible to keep the flesh tissue soft and to prevent the flesh tissue from being hardened also after its cooling due to the fine net-like structure of the flesh tissue. It is possible to increase a moisture holding characteristic of flesh tissue, a degree of hardness or softness and a fine taste adjusting capability.

BEST MODE FOR CARRYING OUT THE INVENTION

Examples of the present invention will be described in detail as follows.

EXAMPLE 1

As fish flesh, three fresh red sea breams were prepared, their sales or heads or internal organs were removed and 2700 g of round fleshes bleached with water was prepared. Then, high concentration solution of salt of 135 cc in 4.3 mol concentration having salt dissolved therein was injected against the fish flesh of 2700 g in a net-like manner. Then, the high concentration solution of salt was impregnated into the fish flesh tissue while applying vibration for five minutes with an electric massage machine so as to perform a dispersion and absorption of the flesh and to promote its salt dissolution characteristic. Then, high concentration solution of alkali of 166 cc in 1.2 mol concentration having $NaHCO_3$ dissoluted therein was injected against the fish flesh in a net-like form, thereafter an aging was promoted in which high concentration solution of alkali was dispersed and absorbed into the fish flesh tissue to apply emulsion formation and gelation capability of the fish flesh while vibration was being applied to the fish flesh for 5 minutes with an electric massage machine.

Then, the obtained sample was confirmed together with a non-processed sample (comparison example) for their variation in tissue by a microscope. Confirmation of them with a magnification rate of 400 times showed that the cell membranes in the comparison example could be confirmed, but the flesh of the present example showed that the cell membranes was broken and the entire membrane was flowed. Then, the example of the present invention was observed again with an electronic microscope under a magnification rate of 60,000 times, and it was confirmed that small bubbles were entered in the myofibrils, the myofibrils were partially cut and an emulsifying phenomenon in view of micro-size was produced there. In addition, it was confirmed that Z-bands were substantially bent, the myofibrils were bulged between the Z-bands to form a spindle shape. As the sample, the skeletal muscles sliced into 70 $\mu$m were used.

As apparent from the foregoing, it was made apparent that taste could be taken out from a cellular level under a bio-chemical reaction produced in a cellular level having a fine net-like structure, seasoning could be carried out under a complex reaction with seasoning materials and the fish flesh could have a taste not found yet in the past. As the disadvantages of the fish flesh processing operation in the prior art, it was pointed out that the processing had an occurrence of drip after freezing and thawing or decay of the flesh tissue, occurrence of fish smell and fading of the fresh color and the like. However, it was made apparent in the example of the present invention that almost of all these problems could be dissolved by improving flesh quality at a cellular level.

EXAMPLE 2

Additive agent solution having sweet sake of 35 cc, Japanese sake of 40 cc as alcohols, Ami-rich GCR (made by Ajinomoto Co., Ltd: hereinafter called as "GCR") of 4.5 g, sorbitol of 55 g, mixtures of vitamin C and vitamin E of 4.5 g mixed and dissolved was injected in a net-like manner against fish flesh of a red sea bream processed in the example 1, thereafter the additive agent solution was dispersed and absorbed in the flesh while vibration was being applied for 5 minutes with an electric massage machine to promote its aging. Then, its fillet flesh was cut into three pieces, their berry bones were removed, the pieces were vacuum packaged in an impermeable synthetic resin bag and frozen at −20° C. for one month. After one month, the pieces were taken out of a freezer and water was poured into them to thaw them. After thawing, fillets were taken out of the bag, they showed superior natures in resiliency, luster, binding characteristic and fresh coloring and even if the fillets were thawed, they showed no drip at all. It was made apparent that they could be utilized in many applications such as sliced raw fish, boiled fish, burned fish, fried fish and meuniere or the like. In addition, it was made apparent that after thawing, they could be utilized as chilled ones and enabled them to be utilized in many applications. The fillet flesh with skin may be set in hot water of 100° C. as required, the flesh may be set rapidly in cold water, cooled, taken out, moisture content of the flesh may be completely removed, then the fish flesh may be rapidly thawed with a continuous freezer, small ice pieces adhered to the surface of the flesh may be removed with a brush, thereafter the flesh may be vacuum packaged in an impermeable bag. At this time, it was made apparent that if deoxidation agent was set in the bag and packaged in it, the flesh could be kept good for a longer time.

EXAMPLE 3

Both side surfaces or central bloody colored flesh and flesh with bones were removed from the fillet skinned hot water processed sea bream which was treated in the example 2, the bream was cut into a sliced raw fish-form, the sliced bream was set in a tray, rapidly frozen, then vacuum packaged, thawed after 10 days and applied for an organoleptic test with five panelists. As a result, they evaluated that the sliced bream had the same texture as that of a fresh sea bream and its taste was better than that of the fresh bream even if the sliced bream was a thawed product.

With the foregoing above, it has been made apparent that the product in the present example is a processed fish flesh having a superior feature after processing in the same manner as that of the examples 1 and 2, the product can be placed in a chilled channel distribution system or rapidly frozen and thawed to be utilized for professional business or home-use application and after thawing, the bream can be set in a distribution channel and sold in a market as a chilled product.

EXAMPLE 4

Internal bones were removed from the red sea bream of fresh fish which was cut into three pieces, the pieces were washed with water and fillet flesh of 3000 g from which water was completely removed was prepared. Then, after high concentration solution of salt of 150 cc in 4.4 mol concentration in which mixtures with salt and $MgCl_2$ in a ratio of 9:1 were dissolved was injected against fillet flesh of 3000 g in a net-like form, the high concentration solution of salt was dispersed and absorbed while vibration was being applied to the flesh for five minutes with an electric massage machine so as to promote a salt dissolution process. Then, after high concentration solution of alkali in 2.1 mol concentration of 140 cc having soda tripolyphosphate dissolved was injected against fillet flesh of 3000 g in a net-like form, high concentration solution of alkali was dispersed and absorbed while vibration was being applied for five minutes with an electric massage machine so as to finish a promotion of aging to add emulsification and gelation capability for the fish flesh tissue. In addition, after additive agent solution having sweet sake of 50 cc, Japanese sake of 50 cc as alcohols, mixtures of vitamin C and vitamin E of 5 g, GCR of 5 g and sorbitol liquid of 85 cc mixed and dissolved therein was injected against the fish flesh in a net-like form, its aging was promoted while vibration was being applied for ten minutes with an electric massage machine, the additive agent solution was being dispersed and absorbed into the fish flesh. Then, the fish flesh of which quality was improved into a fine net-like structure was cut into a sliced raw fish, frozen and dried to make a processed food of red sea bream for a soup. The food was distributed to five panelists in its soup form and its organoleptic test was carried out, resulting that a quite high evaluation was obtained.

Although the prior art product is hard and has no natural taste, it has been made apparent that the examples of the present invention enabled the frozen dry product for soup of red sea bream which is approximate to a texture of raw fish and easily returned back to its state in hot water.

EXAMPLE 5

Fillet-like frozen fish flesh of a walleye pollack of which head and internal organs were removed and washed with water was thawed while its temperature was being monitored and then a fish flesh of 3000 g of which moisture was sufficiently removed was prepared. Then, after high concentration solution of salt of 147 cc in 4.4 mol concentration having salt dissolved therein was injected against the fish flesh in a net-like form, the high concentration solution of salt was dispersed and absorbed in the fish flesh while vibration was given to the fish flesh for five minutes with an electric massage machine so as to promote a salt dissolution. Then, after high concentration solution of alkali of 139 cc in 1.85 mol concentration having $NaHCO3$ dissoluted was injected against the fish flesh in a net-like form, the solution was similarly dispersed and absorbed for five minutes with an electric massage machine so as to promote emulsifying and gelation capability. After this operation, the additive agent solution having sorbitol solution of 110 cc, sweet sake of 48 cc, GCR of 4.5 g, cane sugar of 90 g, mixture of 5 g of vitamin C and vitamin E, Japanese sake of 50 cc and albumen of 28 g dissolved therein was injected against the fish flesh in a net-like form, the solution was similarly dispersed and absorbed for five minutes with an electric massage machine. Then, the fish flesh was rapidly frozen, transferred to a tray, wrapped with a film and preserved for one month within a freezer kept at −25° C. After one month, the flesh was taken out of the freezer and thawed. Occurrence of drip was scarcely acknowledged.

As a comparison example, non-processed fillet flesh of 1000 g in which the processing treatment of the preferred example was not carried out was similarly rapidly frozen, the flesh was taken out after one month and the flesh was thawed. Occurrence of a large amount of drip was acknowledged, fading of flesh color was produced and a decay of flesh was slightly acknowledged. Then, the product of the present example and the product of comparison were changed into a fried cook and a boiled fish cook and they were eaten by five panelists as trial. The product of the present example was soft and they could eat them deliciously. However, the product of comparison was hard and the fried cook showed a peeled-of state of cover and flesh due to shrinkage of the flesh inside the cover and the flesh was decayed when it was cut. This tendency became hard as the cooked product was cooled and time elapsed, the product was hard and was not delicious.

Due to this fact, it was found that the product of the present example had a superior moisture preservation, could prevent drip or improve yield after heating and cooling, keep a softness, improve a decay of flesh and adjust texture in a cellular level with a small amount of salt and further attain the delicious product which could not be attained yet. In addition, it was found that it was possible to reinforce or promote emulsification and gelation capability by dissolving albumen of 1% in sorbitol solution and adding it to the raw material in which denaturation by freezing was generated and a salt dissolution was reduced due to its longer period preservation, to improve flesh quality remarkably and increase quality of fish flesh. In addition, it was found that the product of the present example could be utilized as a retort food or in a canned food under utilization of this characteristic, the flesh was soft and showed a better passing at the throat differing from that of the prior art retort or canned food and then the processed fish flesh having a superior texture and a certain resiliency could be obtained.

EXAMPLE 6

Fillet flesh of frozen walleye pollack of 1200 g was thawed while its temperature was being monitored. Then, after high concentration solution of alkali of 45 cc in 2.0 mol concentration having $Na_2CO_3$ dissoluted therein was injected against the fillet flesh in a net-like form, the solution was dispersed and absorbed into the flesh while vibration was being applied to it for five minutes with an electric massage machine, then after high concentration solution of salt in 4.05 mol concentration of 62 cc having a mixture of salt and KCl dissolved in a ratio of 8:2 was injected against the fish flesh in a net-like form, the salt dissolution was promoted while vibration was being applied for five minutes with an electric massage machine. Then, after the additive agent solution having sweet sake of 20 cc, GCR of 2 g, cane sugar of 18 g, mixture of vitamin C and vitamin E of 2.1 g and wine of 25 cc mixed and dissolved from each other was injected against the fish flesh in a net-like form, dispersion and absorption of the additive agent solution or adding of emulsification capability and aging promotion were carried out while vibration was being applied to it for five minutes with an electric massage machine. Then, after the obtained fillet flesh was cut for a cooking of roasted fish or meuniere, boiled fish, and fried fish without any cover, a rapid freezing was applied to it wit a tunnel freezer, put into an impermeable bag, vacuum packaged there and preserved in a freezer at −20° C. The flesh was taken out of the freezer after one week, thawed and cooked into a roasted fish, meuniere, boiled fish, pot-boiled fish, fried fish without any cover. All these cooks were superior in texture or taste.

In the prior art cooking, since there were much amount of fish smell and a large amount of drip, the fish flesh became hard, fish flesh was shrinked or flesh was remarkably decayed after heating, paste substances were applied to the flesh and sprinkled with bread powder for its fried cook. However, its texture or quality in taste was poor. According to the present example, it was possible to improve texture or taste without using any paste or the like, to make a product with a full 100% fish flesh and to resolve the disadvantages of the prior art. In addition, with the foregoing, it has been found apparent that multi-purpose processed frozen foods suitable for roasted fish, meuniere, broiled fish and fried fish without cover.

EXAMPLE 7

As fish flesh, fillet-like fish flesh with skin of 600 g of Hoki (fresh fish) of which head and internal organs were removed, bleached with water and cut into three pieces was prepared. Then, after high concentration solution of salt of 30 cc in 4.0 mol concentration having salt dissolved therein was injected against the fillet flesh in a net-like form, vibration was applied to it for five minutes with an electric massage machine, then high concentration solution of alkali of 24 cc in 1.2 mol concentration having $NaHCO_3$ was injected against the fish flesh in a net-like form, high concentration solution of alkali was dispersed and absorbed into the fish flesh while a low speed operation of the vacuum massage machine was being carried out for five minutes so as to promote emulsification and gelation capability. Then, after the additive agent solution having sorbitol liquid of 17 cc, sweet sake of 10 cc, GCR of 1.0 g, mixture of vitamin C and vitamin E of 1.0 g, Sun-frabon HG acting as deodorant (made by Taiyo Kagaku Co., Ltd.) of 0.9 g and Japanese sake of 10 cc dissolved therein was injected against the fish flesh in a net-like form so as to attain dispersion and absorption of the additive agent solution and aging promotion while a low speed operation of an electric massage machine was being carried out for five minutes. A product test was carried out for the obtained sample. The test results were indicated in Table 1.

As for the product test, a roasting test and a fried test without any cover were carried out with the fillet Hoki of the present example being cut. As for the comparison example, fillet cut flesh cut into three pieces was prepared in the same manner as that of the present example except the condition in which the processing treatment of the present example was not applied.

(1) As for the roasting test, a hot plate set at a temperature of 167° C. was used, and both front and rear surfaces of the flesh were roasted for eight minutes.

(2) As for the fried test without any cover, Tempura oil of which temperature was adjusted to 180° C. was applied and oil adjustment was carried out in three minutes.

Each of the yields was as follows. (Each of the samples had six pieces and its yield was applied in its average value.)

Then, a product test was carried out for each of the obtained products.

1. Product of the example:

In case of the fried product without any cover, there was no clearance between the flesh and the cover due to expansion of the flesh, no heating shrinkage of the flesh was present and a soft and bulged state was kept. In addition, the product fried with oil had a light brown in color at its surfaces and showed a nice taste. As for roasting, no crack in flesh as well as no decay in shape of the flesh was made, it had a superior degree of whiteness, had a superior moisture preservation, resulting in that its reduction in weight was less even after a time elapsed, it showed a better resistance against the teeth and delicious taste.

2. Product of the comparison example

As time elapsed, moisture contained in the product was evaporated, the product was hardened and its color was changed into black. As the product was gradually dried, the white-colored product was changed into black-colored product and correspondingly its taste was deteriorated. In addition, the flesh was remarkably cracked and three pieces of products were cracked.

In the prior art cooking, since there were much amount of fish smell and a large amount of drip, the fish flesh became hard, fish flesh was shrinked or flesh was remarkably decayed after heating, the flesh could be utilized only for the fried cook, paste substances were applied to the flesh for its fried cook and sprinkled with bread powder. However, its taste or texture was poor. In the product of the present example, even if the paste or bread powder was not used and only fish flesh was applied, the product having a superior taste or texture could be obtained and the problems in the prior art could be resolved. It was made apparent that NaHCO3 was used as alkali, a value of pH of the processed food could be reduced, a stable quality could be maintained and a processed fish flesh suitable for heated and cooked daily dish could be attained.

EXAMPLE 8

Fillet-like fleshes of 900 g of a Hoki (fresh fish) of which head, internal organs, skins and bones were removed and cut into three pieces were bleached with water, then roughly minced by a grinder [a meat grinder, model MK-GL2, made by Matsushita Electric Industrial Co.,Ltd.(10 mm)]. Processed minced flesh was put into a mixer, high concentration solution of salt of 45 cc in 4.0 mol concentration having salt dissolved therein was atomized against the flesh by an atomizing machine and further high concentration solution of salt was impregnated into the minced flesh while a low speed operation of the atomizing machine was being carried out for five minutes. Then, high concentration solution of alkali of 63 cc in a 1.0 mol concentration having $NaHCO_3$ was impregnated into the flesh while the solution was being atomized by an atomizing machine and also a low speed operation of the mixer was being carried out, the salt dissolution was promoted while the salt solution and alkali solution were being dispersed and absorbed, emulsifying and gelation capability were applied to promote a binding characteristic. Then, the additive agent solution having sweet sake of 15 cc, Japanese sake of 15 cc, GCR of 1.5 g, cane sugar of 27 g and mixture of vitamin C and vitamin E of 1.5 g mixed and dissolved from each other was impregnated into the minced flesh while the solution was being injected against it by an atomizing machine and also while a low speed operation of a mixer was being carried out for five minutes. Then, the produced minced flesh was formed into a steak shape, heated and a product test was carried out.

Although in the prior art, the minced flesh was processed into a sheet-like block with the animal and plant proteins powder being applied as a binder, presence of free water or fat, fat caused the flesh to be easily separated and hard after heating and its moisture preservation was poor. However, according to the present example, it was made apparent that it was possible to increase a salt dissolution characteristic of protein contained in the fish flesh only with the fish flesh without using any binding agent to improve fat, to increase a superior heating binding characteristic even if fat was mixed in the flesh and further to improve a moisture preservation characteristic, a resiliency and a rate of expansion. Further, in accordance with the present example, it was made apparent that the flesh could be molded into and utilized for multi-purposes and the fishes of low utilization type could be highly utilized.

EXAMPLE 9

Additive agent solution having calcium of 100 mg (made by Wada Pharmaceutical Co., Ltd.: a product name: Wada calcium) acting as a functional agent, sorbitol liquid of 10 cc, vitamin complex of 0.2% containing vitamins C, E, $B_6$, $B_{12}$ dissolved therein was mixed and kneaded to each of 100 g of Hoki filet cut piece of the product of the present example 7 and a Hoki rough minced flesh of the present example 8 and then the additive agent solution was dispersed and absorbed into the raw material of flesh.

In general, although a Hoki and a walleye pollack and the like had lightness in taste and low calorie, their functional characteristic was low. In view of this fact, it was necessary to increase a functional characteristic in compliance with a need of consumers and so functional agents were sprinkled over or coated on the fish flesh. The functional characteristic could not be added to the cellular level, the agents were merely adhered to the surface of the fish flesh, were quite unstable, resulting in that the function could not be sufficiently realized, and in particular, its function might be damaged during heating operation. According to the present example, it was made apparent that since these functional agents were dissolved in high concentrated solution, impregnated into the fish flesh tissue by injection or the like, their dispersion and absorption were carried out, resulting in that the functional agents were uniformly dispersed and absorbed in the fish flesh to enable a functional characteristic to be given to the fish flesh in a quite short period of time.

EXAMPLE 10

Processed fish flesh treated in the example 9 was freely molded into a steak form, a stick form, a hamburger form, and a dice shape or the like. In this case, a cover made of bread powder, seed powder and powder milk or the like may be coated on the surface of the fish flesh.

According to the present example, since the functional agents were uniformly distributed in the fish flesh, the fish flesh had a high stability against heat and the functional characteristic could be highly realized. In addition, it was made apparent that a proper thin paste was coated to prevent the fish flesh from being directly contacted with heat, bread powder, seed powder, powder milk, or a crape or a dumpling skin or the like were adhered to the surface of the fish flesh to enable even a thin flesh to prevent a denaturation of the functional agents against heat, resulting in that the chilled frozen processed food for multi-purpose having an improved function could be realized.

EXAMPLE 11

After high concentration solution of salt of 150 cc in 4.5 mol concentration having salt of mixture of NaCl and KCl dissolved in ratio of 1:1 was injected against the fish flesh of a swordfish in a net-like form for a thawed fillet fish flesh of 3000 g while frozen raw material with its head and internal organs being removed and blood being removed as well was being monitored for its temperature, its salt dissolution characteristic was promoted while a vibration was being given to the flesh for five minutes with an electric massage machine. Then, after high concentration solution of alkali of 140 cc in 1.9 mol concentration having $NaHCO_3$ dissolved therein was injected against the fish flesh in a net-like form, vibration was given to the fish flesh for five minutes with an electric massage machine, the flesh tissue was dissolved in salt and concurrently, emulsification and gelation capability were given to it so as to improve it into fine net-like structure and then its aging was promoted. After this operation, the additive agent solution having sweet sake of 50 cc, Japanese sake of 50 cc, GCR of 5.0 g, granular sorbitol of 60 g, mixture of 5 g of vitamin C and vitamin E dissolved therein was injected against the fish flesh in a net-like form, vibration was given to it for five minutes with an electric massage machine and then the dispersion and absorption of the additive agent solution were carried out to promote the aging. Then, the sample was processed into a sliced raw fish form.

Then, variation of tissue was confirmed together with the non-processed sample (comparison example) under its magnification of 400 times by an optical microscope. It was confirmed that the sample of comparison showed a skeletal muscle tissue having muscle bundle of myofibrils, although the sample of the present embodiment showed that peripheral membranes, internal membrane collagen, erastin fibers or the like were dissolved with dispersed salt and each of them was replaced and bulged into muscle bundles.

In addition, it was confirmed by a photograph taken by an optical microscope for showing the myofibrils cut in a lateral direction that the comparison example could acknowledge white spots of ice crystal in a width of normal tissue in the skeletal muscles and an interface between the cell membranes, although the sample of the present example could acknowledge a gelation state in which it was improved into a fine net-like structure, the substances which were assumed to be dissolved low molecules and fibrous protein were contained in the net and their quality were highly improved.

In view of the above, the sample of the present example was magnified again by an electronic microscope to observe it, resulting in that it was revealed that small bubble-like substances entered between the myofibrils and the myofibrils were partially cut. In addition, it was confirmed that the Z-bands were also remarkably bent, the myofibrils were bulged out between the Z-bands to form a spindle shape. As the samples, skeletal muscles sliced into 70 μm were used.

As apparent from the foregoing, it was possible to extract taste from a cellular level under a bio-chemical reaction with the fine-net like structure being applied, to perform a seasoning complexed with the seasoning agents and to produce the taste not found yet in the fish flesh of the prior art. As the disadvantages of the prior art fish flesh, occurrence of drip after freezing or thawing, a decay of flesh tissue caused by activation of enzyme, occurrence of fish smell and fading of fresh color or the like were pointed out, although it was made apparent in the present example that the problems in quality which could not be resolved in the prior art can be resolved by improving quality at a cellular level under utilization of the flesh substances without adding any animal and plant proteins. Further, it was made apparent that this improvement in quality can be sufficiently produced in a short period of time.

Injection of high concentration solution of salt or high concentration solution of alkali may be carried out concurrently or separately for side surfaces, front surface and rear surface of the fish flesh.

Obtained sliced fleshes were tested for their organoleptic test by five panelists. It was made apparent that the sliced flesh was superior in color and texture as well.

The prior art utilization of tunas or the like was carried out such that the tuna was decomposed into blocks in its fresh state, the decomposed blocks were further processed into rectangular forms, the rectangular forms were cut out and utilized as sliced fish flesh. Frozen raw material was semi-thawed and processed into blocks, thereafter cut into rectangular forms and utilized as a sliced raw fish flesh. Both of them produced rapid reduction in quality, generated a self-digestion with activation of enzyme, flowing-out of drip, fish smell, decoloring of flesh and decay of tissue could easily be produced, resulting in that they became a substantial prohibition in utilization and they have not been resolved yet.

In the present example, it has been made apparent that flowing-out of the drip or occurrence of fish smell can be prevented and these problems can be resolved. That is, the flesh quality can be improved at a cellular level, the taste can be extracted from the fish flesh, a seasoning taste complexed with seasoning agents can be carried out, resulting in that a taste not found in the prior art could be attained. As desired, similar effect could be attained even by a method in which the seasoning agents are not used. It has been made apparent that after processing, the flesh might be cut into three pieces or two pieces and they might be set in a distribution channel under chilled state in the forms of fine-sliced shape, or block, fillet, rectangular shape. It has been made apparent that the flesh may be rapidly frozen and after being set in a distribution channel, the flesh may be thawed and utilized for multi-purpose application and further as for the fresh fish, this may be similarly processed in the same manner as that for the frozen product.

EXAMPLE 12

Block-like processed fish flesh treated in the example 11 was filled in a can, its lid was wound and fastened while air was being removed from within the can, heated under 2 atmospheric pressure, at a temperature of 120° C. and for 30 minutes, thereafter the flesh was cooled to make a canned food. This canned food was opened to check the flesh quality, resulting in that it became possible to get a canned food not found yet in the prior art in which moisture separation in the fish flesh was less, the flesh had a superior resiliency and a superior moisture preservation, a well resistance against the teeth and a better feeling in passage at the throat. In addition, the fish flesh had no decay in shape, but had a soft and bulged form, the surface of the flesh was minute in texture, resulting in that the canned food containing rolling taste in the flesh could be attained, the flesh absorbed its dew to provide its weight.

Although the prior art flesh showed that moisture was separated from the fish flesh, a large amount of taste in the flesh in the can were discharged out, the flesh had no dispersed state, no resiliency and bad feeling in passage at the throat, it has been made apparent that the present example can solve these problems.

EXAMPLE 13

Block-shaped processed fish flesh treated in Example 11 was cut into a sliced form, the sliced pieces were canned in a can, its lid was fastened while air was being removed inside the can, the can was put into a pressure vessel, heated for 30 minutes under 2 atmospheric pressure, at 120° C., sterilized, cooled and the canned food was made. As a result, an evaluation which is similar to that of Example 12 could be obtained.

EXAMPLE 14

Block-shaped or fillet-shaped processed fish flesh treated in the example 11 was cut into rectangular pieces in compliance with its purpose and vacuum packaged.

In this example, it became possible to provide a convenient cooked frozen food or a heated cooked food in which drip or the like are not produced, deterioration in quality such as color fading can be prevented, the food can be utilized as cut and sliced pieces, fish steak, meuniere, roasted fish, broiled fish and dried fish, the food can be taken out of a refrigerator at any time and at any place, and utilized. In addition, it became apparent that the rectangular fish fleshes are not decayed in their shape through vacuum packaging after they are rapidly frozen.

EXAMPLE 15

As a fish flesh, a fresh fish of a walleye pollack with its head and internal organs as well as blood removed was cut into two pieces as it was and a fillet flesh with skin removed was prepared. Then, after the fillet flesh was pretreated into mince form, high concentration solution of salt of 150 cc in 4.0 mol concentration having salt dissolved therein was injected against fish flesh of 3000 g, and vibration was given to the flesh for five minutes by an electric massage machine. Then, after high concentration solution of alkali of 180 cc in 1.2 mol concentration having $NaHCO_3$ was atomized against the flesh, the flesh tissue was dissolved in salt while vibration was being applied for five minutes by an electric massage machine, emulsification and gelation capability were added to improve its quality into fine net-like texture and aging was promoted. Then, after additive agent solution having sweet sake of 50 cc, Japanese sake of 50 cc, GCR of 5 g, sorbitol of 60 g, and mixture of 5 g of vitamin C and vitamin E dissolved therein was injected against the flesh, the additive agent solution was dispersed and absorbed while vibration was being given for five minutes by an electric massage machine, and aging was promoted. Frozen raw material was thawed while its temperature was being sufficiently monitored, and processed in the same manner as that of fresh fish.

This processed fish flesh was applied to make the following processed foods.

(1) The fish flesh was vacuum packaged in a unit of 100 g in its minced state, rapidly frozen to get frozen processed fish flesh for a bowl rice and a rice wound with sea weed.

(2) The fish flesh of 150 g was molded into a round shape or an ellipse shape, rapidly frozen, vacuum packaged to get a frozen processed fish flesh suitable for a fish flesh hamburger.

(3) After the processed fish flesh of 80 g was adhered to a round bar, the flesh was heated for 15 minutes at 80° C., the flesh was cooled, vacuum packaged, chilled or rapidly frozen or vacuum packaged while its raw frozen state was being kept to get a frozen processed fish flesh for a Tsukune. Due to its superior binding characteristic, this product could be obtained easily and in a high yield.

(4) Material having egg mayonnaise of 100 g mixed against minced fish flesh of 100 g was vacuum packaged in a unit of 100 g, rapidly frozen to get a frozen processed fish flesh suitable for a rice round with sea weed of a Negitoro or a rice bowl with tuna.

(5) After 5 mm square cheese of 150 g was mixed with minced fish flesh of 1000 g, the mixed material was molded into a block of 150 g for a steak or a hamburger or a stick of 30 g, they were rapidly frozen and vacuum packaged to get a packed frozen processed fish flesh.

(6) Rough minced processed fish flesh of 200 g was heated for 10 minutes at 100° C. while being separated, the flesh was canned in a can, its lid was fastened around it while air was being removed, the canned food was heated for 30 minutes under 2 atmospheric pressure and at 120° C., cooled to make a canned product. Upon opening of the can to check a quality of fish flesh, it became possible to make a canned food in which the flesh itself absorbs separated moisture in the flesh, keeps its superior resiliency or moisture preservation, has a better resistance to the teeth, no decay in shape, a soft and bulged fine texture of a surface of the flesh, a rolling taste in the flesh and a superior comfortable feeling in passage at the throat. Although the prior art product was not well adapted in a market due to moisture separation in the flesh, discharging of a large amount of taste of flesh in the can, separated fish flesh in the can, no resiliency of the flesh and bad feeling in passage at the throat, the present invention could resolve these problems.

(7) Processed fish flesh minced in middle level was separated while being heated in advance, sauce was added to the separated flesh, the flesh was set in a retort pouch, heated for 20 minutes under 2 atmospheric pressure, 120° C., then cooled to make sauce. Upon opening of this canned product to check a quality of it, although the prior art product was not well adapted in a market due to discharging of a large amount of taste of flesh in the can, a filament-like separation of fish flesh in the can, no resiliency of the flesh and bad feeling in passage at the throat, the present invention could resolve these problems. Thus, it became possible to get sauce in which the flesh itself has a less amount of separated moisture in the flesh, absorbs flesh dew, keeps its superior resiliency or moisture preservation, has a better resistance to the teeth, no decay in shape, a soft and bulged fine texture of a surface of the flesh, a rolling taste in the flesh and a superior comfortable feeling in passage at the throat.

(8) Minced fish flesh of 900 g was processed in the same manner as that of fish flesh, rough-minced beef meat of 150 g and seasoning agents were mixed to each other, they were set in a stuffer, each block of 60 g was charged in a sheep gutter, then boiled for about two minutes at 100° C., they were set semi-raw state, and cooled with cold water. After cooling, they were packaged in bags, rapidly frozen to get a fish flesh wiener. The prior art product had problems that heating causes fish flesh or meat to be shrinked, the flesh is apt to be separated, moisture content is separated and fish smell is increased. Due to this fact, many kinds of additive agents were used in the prior art product. In the present example, these prior art problems are overcome, and there is provided a rough minced type fish weiner with beef meat in which the flesh is bulged during heating, the flesh is soft and has a superior resiliency as well as a better resistance to the teeth.

(9) Beef meat of 150 g processed in the same manner as that of the fish flesh is roughly minced and mixed with crushed fish flesh of 900 g and they are molded by a molding device into a dice shape or a steak shape in compliance with its target shape. The flesh was rapidly frozen and vacuum packaged to get a frozen processed food with beef meat having a gelation capability.

EXAMPLE 16

(1) After high concentration solution of salt of 150 cc in 2.8 mol concentration having salt dissolved therein was injected against the fine cut fish flesh of 3000 g of frozen raw material of a walleye pollack with head, internal organs and blood being removed which was thawed with its temperature being monitored, cut into two pieces, had skins removed and sliced into fine pieces, its salt dissolution was promoted while a vibration was being applied for 5 minutes by an electric massage machine.

Then, high concentration solution of alkali of 110 cc in 1.8 mol concentration of $Na_2CO_3$ was injected against the flesh while a vibration was being given to it for 5 minutes by an electric massage machine, salt dissolution of flesh tissue was promoted, emulsifying and gelation capability were added to the flesh tissue to change it into a fine net-like texture and then an aging was promoted.

After this operation, additive agent solution having sweet sake of 50 cc, Japanese sake of 50 cc, GCR of 5 g, sorbitol of 60 g, mixture of 5 g of vitamin C and vitamin E dissolved therein is added to the flesh by an atomizer machine, these additive agent solutions were dispersed and absorbed into the flesh tissue while a vibration was being given to the flesh for 5 minutes by an electric massage machine and its aging was promoted.

Then, the flesh was vacuum packaged in a package of 100 g, rapidly frozen to make a case of 5 sheets in one pack to make and process frozen tuna sliced pieces.

Subsequently, a product test was carried out with this sample. After the sample was held for one day in a home-use refrigerator, the sample was thawed and its aging variation was confirmed. It was made apparent that the product of the present example has emulsified moisture in the flesh, the product can be thawed rapidly and quality as sliced pieces is not damaged for 5 to 6 hours after thawing due to the fact that the moisture is emulsified in the flesh. It was also made apparent that the fresh fish can be processed in the same manner by cutting the fresh fish into two pieces and removing the skin from it.

(2) A swordfish cut flesh of 50 g pre-processed in the above (1) and a curry roux of 150 g were combined, the combined product was set in a retort pouch, air in a container was removed and the container was sealingly closed. Six sets of these containers were prepared. They were applied with pressure, heat and sterilization at a pressure of 2 atmospheric pressure, heating temperature of 120° C. for 20 minutes to make a curry having retort small fish flesh pieces.

(3) A swordfish cut flesh of 50 g pre-processed in the above (1) and a curry roux of 150 g were combined, the combined product was set in a can container, its lid was fastened while air in the container was being removed, the flesh product was applied with pressure, heat and sterilization at a pressure of 2 atmospheric pressure, heating temperature of 120° C. for 30 minutes to make a canned curry having small fish flesh pieces.

(4) A swordfish cut flesh of 50 g pre-processed in the above (1) and a curry roux of 150 g were combined, the combined product was set in a plastic air-tight container, air was removed, nitrogen gas was poured into the container and the container was air-tightly sealed. Six sets of the containers were made. Then, the flesh product was applied with micro-wave radiation, pressure, heat and sterilization at a pressure of 2 atmospheric pressure, heating temperature of 120° C. for 20 minutes to make a curry having small fish flesh pieces set in an air-tight container.

(5) As a comparison example, the same raw material as that of the example was applied, a swordfish sliced cut flesh of 300 g not processed with that of the example was prepared, the fine cut flesh of 50 g and curry roux of 150 g were combined, they were set in a retort pouch, air in a container was removed and air-tightly sealed. Six sets of the container were made. The products were applied with pressure, heat, sterilization within a pressurizing kettle at 2 atmospheric pressure, heating temperature of 120° C. and for 20 minutes to make a retort curry having small fish flesh pieces.

(6) As a comparison example, the same raw material as that of the example was applied, a swordfish sliced cut flesh of 300 g not processed with that of the example was prepared, the fine cut swordfish flesh of 50 g and curry roux of 150 g were combined, they were set in a can container, its lid was fastened while air in the container was being removed and the products were applied with pressure, heat, sterilization at 2 atmospheric pressure, heating temperature of 120° C. and for 30 minutes to make a canned curry having small fish flesh pieces.

(7) As a comparison example, the same raw material as that of the example was applied, a swordfish sliced cut flesh of 300 g not processed with that of the example was prepared, the fine cut swordfish flesh of 50 g and curry roux of 150 g were combined, they were set in a plastic air-tight container, air was removed from the container and nitrogen gas was poured into the container. Six air-tight sealed units were made. The products were radiated with micro-wave, applied with pressure, heat, sterilization at 2 atmospheric pressure, heating temperature of 120° C. and for 20 minutes to make a curry having small fish flesh pieces stored in an air-tight container.

Roasting yield comparison test was carried under the same condition for the retort products obtained by the aforesaid experimental example (2) and the comparison example (5), the canned products obtained by the experimental example (3) and the comparison example (6) and the micro-wave processed products obtained by the aforesaid experimental example (4) and the comparison example (7), respectively. The test results are indicated in Table 2.

As apparent from Table 2, the following results were attained.

Products of the example: It was possible to get a retort product not found in the prior art in which its flesh was soft and bulged, no flowing-out of dissolved substance occurred, the flesh had a resiliency, a nice color and a superior taste. Although the micro-wave processed product showed a slight reduction in yield, its taste was substantially the same as that of the retort product.

Products of comparison example: Their yield was poor, protein or cell membranes, perimysium, collagen or the like in the flesh fibers were dissolved and flowed out of the flesh tissue due to high pressure and hot heat and the fish flesh was completely separated. In addition, the flesh was hard, its moisture preservation was remarkably deteriorated, had no taste, its color was faded and the flesh was shrinked. The micro-wave processed product was in particular deteriorated in its yield.

EXAMPLE 17

As a fish flesh, fillet flesh of a sea eel having a larger barrel which was hardly utilized in general was opened at its back, its bones were removed and the flesh was cut into two pieces, and then the cut pieces were bleached with water, the moisture content in the flesh was completely removed, and it was set in a flesh taking machine (2 mm) to make a scrambled flesh. Mixing and kneading of the flesh were carried out by a low speed kneader for 5 minutes while high concentration solution of salt of 150 cc in 5.4 mol concentration having salt dissolved therein was being applied uniformly to the obtained scrambled flesh of 3000 g with an atomizing machine so as to disperse and absorb the salt solution. Then, mixing and kneading of the flesh were carried out by a low speed kneader for 5 minutes while high concentration solution of alkali of 140 cc in 2.0 mol concentration having $NaHCO_3$ dissoluted therein was being applied uniformly to the obtained scrambled flesh of 3000 g with an atomizing machine so as to disperse and absorb the alkali solution. Subsequently, additive agent solution having sweet sake of 100 cc, Japanese sake of 50 cc, soda gltamate of 5 g acting as seasoning agent, cane sugar of 40 g, gulcose of 20 g, a mixture of 3 g of vitamin C and vitamin E dissolved therein was uniformly atomized against the flesh, dispersion and absorption of the solution into the flesh while mixing and kneading were being carried out against the flesh for 5 minutes with a low speed kneader to make a flesh having rough minced taste. Then, the skin part was frozen, frozen skin was crushed and non-processed flesh of walleye pollack of 20% was blended. Then, this mixed flesh of 3000 g was set in a silent cutter, high concentration solution of salt in 5.4 mol concentration of 150 cc having salt dissolved was added, mixing and kneading were carried out for 5 minutes to perform dispersion and absorption of the solution. Then, high concentration solution of alkali in 2.0 mol concentration of 140 cc having NaHCO3 was mixed in it, mixing and kneading were carried out for 5 minutes to perform dispersion and absorption. After this operation, additive agent solution having sweet sake of 100 cc, Japanese sake of 50 cc, soda gltamate of 5 g acting as seasoning agent, cane sugar of 40 g, gulcose of 20 g, a mixture of 3 g of vitamin C and vitamin E dissolved therein was added, and mixing and kneading were carried out for 5 minutes, dispersion and absorption of the solution into the flesh were performed to make a seasoned paste flesh. Then, the seasoned paste flesh was fed out in a sheet form from a fish flesh pump nozzle to a vertical heating tunnel type continuous heating furnace, and pushed onto a steel belt coated with Teflon. Then, the tasted and rough minced flesh of sea eel was fed out of another fish flesh pump nozzle in a sheet form onto a tasted paste flesh heated in a full-opened state at its cut plane and piled up, the flesh was roasted into the full-opened state to manufacture a full-opened roasted sea eel processed and cooked food.

The full-opened roasted sea eel processed product of the present example was a full-opened roasted sea eel in which its piled-up layer section has a roasting color similar to that of the full-opened roasting of sea eel, has more superior taste and texture than those of a normal full-opened roasted sea eel. In view of this fact, it was also made apparent that according to the present example, it was possible to make a processed, tasted and roasted sea eel flesh having a superior free-molding feature with utilization of a large-sized sea eel having no decay in shape, having a resiliency, and emulsification as well as gelation formation.

EXAMPLE 18

Fillet flesh in which an eel was opened at its back, its bones were removed and the eel was cut into two pieces was bleached with water, then moisture content in the flesh was completely removed and this fillet flesh of 3000 g was prepared. High concentration solution of salt in 4.3 mol concentration of 150 cc having salt dissolved was injected uniformly against the fillet flesh of 3000 g, the salt solution was impregnated and absorbed in the flesh, thereafter the dispersion and absorption of the salt solution were performed while a low speed operation of a mixer i.e. mixing and kneading, were being carried out for 5 minutes. Then, high concentration solution of alkali in 1.6 mol concentration of 140 cc having $NaHCO_3$ was uniformly injected against the fish flesh to impregnate alkali solution, thereafter mixing and kneading were performed for 5 minutes with a mixer to perform dispersion and absorption and emulsifying and gelation capability were given. After this operation, additive agent solution having sweet sake of 100 cc, Japanese sake of 50 cc, soda gltamate of 5 g acting as seasoning agent, cane sugar of 40 g, gulcose of 20 g, a mixture of 3 g of vitamin C and vitamin E dissolved therein was uniformly atomized against the fish flesh, thereafter mixing and kneading were performed by a low speed operation of a mixer for 5 minutes and dispersion and absorption of the solution into the flesh were performed. Then, the flesh was heated by a tunnel type continuous heating furnace (a vertical heating type). After this operation, the full-opened flesh was packed in a package, a rapid freezing was performed to make a full-opened packed eel.

According to the present example, it was made apparent that even if the flesh was rapidly frozen and a long period of time elapsed after its thawing, it was possible to make a full-opened roasted eel which was soft, had a superior resiliency, an increased yield, a superior taste, a nice roasting color and showed a superior adaptability for distribution channel.

EXAMPLE 19

Dress-like processed frozen raw material of a mackerel which is a kind of blue-backed fish of high caught volume of 3000 g was prepared while its temperature was being monitored. Then, mixture of 5 g of vitamin C and vitamin E dissolved in high concentration solution of salt in 5.5 mol concentration of 150 cc having high-class salt dissolved was dissolved in respect to the dressed flesh of 3000 g, the solution was injected against the flesh in a net-like form, thereafter the salt dissolution was promoted while the processing was performed for 5 minutes with ultrasonic wave processing. Then, high concentration solution of alkali in 1.2 mol concentration of 200 cc having NaHCO3 dissolved therein was injected against the fish flesh in a net-like form, thereafter the flesh tissue was dissolved in salt while a processing was being applied for 10 minutes with a ultrasonic wave, gelation and emulsification were attained and an aging was promoted while the tissue was being changed into a fine net-like texture. Then, additive agent solution having sweet sake of 50 cc, GCR of 5 g, a mixture of 5 g of vitamin C and vitamin E, and Japanese sake of 50 cc mixed and dissolved therein was injected against the fish flesh in a net-like form, thereafter a mixing of additive seasoning agent and an aging were performed while a processing was being carried out for 5 minutes with an ultrasonic wave.

The produced product of the present example and the product of comparison where no processing of the present example were preserved in a refrigerator at 5° C. and a preservation test was performed. The product of comparison produced bad odor and sticky flesh dew. In turn, the product of the present example did not produce any decay even after elapsing of 10 days, it kept a sufficient freshness even at 14 days, its quality could be maintained, a high lactic acid was acknowledged in the flesh, a value of pH was decreased, and a salty product having a stable quality could be manufactured. This processing method was applied to marine products such as a horse mackerel, a mackerel pike or the like, even a certain difference was acknowledged in individual products, a similar effect could be attained.

EXAMPLE 20

High concentration solution of salt of in 4.5 mol concentration of 150 cc having salt dissolved therein was atomized against the horse mackerel of 3000 g in which internal organs and scales were removed and its back was opened, and the salt dissolution was promoted in the flesh while a vibration was being given for 5 minutes with an electric massage machine. Then, high concentration solution of alkali in 2.0 mol concentration of 140 cc having $NaHCO_3$ dissoluted therein was atomized against the aforesaid fish flesh, the flesh tissue was dissolved in salt while a vibration was being applied for 5 minutes with an electric massage machine, emulsifying and gelation were given to improve it into a fine net-like texture and then an aging was promoted. Then, additive agent solution having sweet sake of 50 cc, GCR of 5 g, a mixture of 5 g of vitamin C and vitamin E, and Japanese sake of 50 cc mixed and dissolved therein was atomized against the fish flesh, a vibration was given to the flesh for 5 minutes with an electric massage machine, a uniform impregnation of the additive agent and an aging promoting operation were carried out in a short period of time, they were set at once in a cold air drying machine, dried for 8 hours to get an opened mackerel.

Although the prior art product advanced its drying state during passing through a distribution channel and a selling route, produced an oil roasted state and its taste was gradually deteriorated and became hard, the product of the present example could make a processed opened mackerel in which the flesh tissue is dissolved in salt, improves by itself into a fine net-like texture through adding of emulsifying and gelation capability by absorbing all atomized high concentration solution of salt and high concentration solution of alkali in the fish flesh, the soft and resilient taste of cellular level in high moisture preservation is pulled out by performing the aging promoting operation in a short period of time, resulting in that deterioration in quality such as oil roasted state during its passing in a distribution channel was less, a high yield was attained, a flexible and high anti-oxidation characteristic is attained under a reaction at a cellular level of the mixture of vitamin C and vitamin E.

Although the opened mackerel dried under natural sun light was superior in view of both surface color and taste, this product generated a deterioration of oil roasted state after aging and it was made apparent that the product of the present example hardly produced an oil roasted state and had a longer preservation time than that of the prior art by two times or more.

EXAMPLE 21

Both front and rear surfaces of the fish fleshes such as dressed horse mackerel, mackerel pike and mackerel processed in the same manner as that of the mackerel of the example 19 were roasted with a far infrared ray for 7 to 15 minutes in such a way that a central part temperature of the fish flesh became 95° C. After this operation, the fish flesh was cooled down by a cold air cooling machine until a central temperature of the fish flesh became about 15° C. Then, the processed flesh was vacuum packaged while paying a sufficient attention to its sanitary control and an aging variation in 14 days was checked.

Although the prior art product had a decay in shape of flesh or hardened flesh and an increased fish smell, it was made apparent that the product of the present embodiment could be made such that its flesh did not show any decay, its flesh was soft, had a high moisture preservation, a high resiliency, its taste seasoning was performed down to a cellular level, and a cooked roasted fish having a quite delicious taste under a complex reaction with amino acid contained in the fish flesh together with seasoning agent. In addition, it was made apparent that the product of the present example could be distributed in a freezing system or in a chilled system.

EXAMPLE 22

After high concentration solution of salt in 4.3 mol of 150 cc having salt dissolved was injected in a net-like form to a fish flesh of fillet white salmon having an opened berry of 3000 g, a salt dissolution characteristic was promoted while a vibration was being given to the flesh for 5 minutes with an electric massage machine. Then, after high concentration solution of alkali of 140 cc in 2.0 mol concentration having $NaHCO_3$ was injected against the fish flesh in a net-like form, flesh tissue was dissolved in salt while a vibration was being given to the flesh for 5 minutes with an electric massage machine, emulsifying and gelation capability were given to the flesh and aging promotion operation was performed so as to improve it into a fine net-like texture. Then, after additive agent solution having sweet sake of 50 cc, Japanese sake of 50 cc, GCR of 5 g, a mixture of 5 g of vitamin C and vitamin E dissolved therein was injected against the fish flesh in net-like form, dispersion and absorption of the additive agent solution as well as aging promotion were performed in a short period of time while a vibration was being given to the flesh for 5 minutes with an electric massage machine to make a tasted salted salmon.

The prior art salted salmon was manufactured by directly sprinkling salt and immersing the salmon in salt water for a long period of time. In the case that salt was sprinkled over the salmon, excessive taking of salt was resulted in deteriorating a human health. In addition, in accordance with the immersion method, the immersion required a long period of time, taste of low molecule in the fish flesh was discharged out due to an osmotic pressure and the flesh was deteriorated, and concurrently an amount of inclusion of salt was increased. In addition, in case that the salmon with low salt was applied, it had a problem that a putrefaction phenomenon was produced within one week while it was being left in a home-use refrigerator (5° C.).

To the contrary, salt of about 1% in respect to the fish flesh was used in the product of the present example, although it was assumed that the myofibril was relaxed, salt dissolution degree was increased and emulsifying and gelation capability were added together with alkali agent, it showed a longer preservation and no putrefaction was produced even after 15 days elapsed. Although a detailed reason for this phenomenon is vague, it may be assumed that lactic acid in the fish flesh is dissolved and discharged to make a rapid reduction of a pH value and concurrently drip is not produced at all, resulting in that a progression of bacteria can be prevented, low molecular taste substance which may easily be decayed is dispersed sufficiently within the skeletal muscles under emulsification and gelation formation, and held in the myofibrils improved in fine net-like form.

EXAMPLE 23

Chilled silver salmon was got, cut into three pieces and changed into a fillet state. Seven samples of A to G were made in 300 g of the silver salmon.

I-liquid indicated in Table 3 was injected in a net-like form against each of the samples and its aging was promoted while a vibration was being given against the sample for 3 minutes with an electric massage machine. Then, II-liquid was injected against the sample in a net-like form, salt dissolution, emulsifying and gelation capability were promoted while a vibration was being given to the sample for 6 minutes with an electric massage machine. After processing, the samples were stored in the refrigerator for 24 hours, the samples were frozen, vacuum packaged and then stored in a freezer. The comparison example G not processed was similarly frozen, vacuum packaged and stored in a freezer. A weight parts in ( ) in Table 3 indicates a dry weight in respect to 100 weight parts of the frozen fish flesh.

Although the experimental examples A, D; B, E; C, F are the same to each other in a chemical product blending ratio, I-liquid and II-liquid are reversed and order of injection for them is made different.

After the fish was frozen and stored for 7 days, thawed, its half part was sliced into pieces, remaining half part was roasted to get a sample. Then, ten panelists performed organoleptic test for (1) color, (2) shape holding state after cut, (3) drip occurrence, (4) resiliency, (5) taste of the sliced piece. As for the roasted product, they performed organoleptic test for (6) outer appearance, and (7) taste. In the organoleptic test, 10-point (a full point of 70) process was applied for evaluation. The test results were indicated in Table 3.

As apparent from Table 3, it can be said that the samples A to F of the present example got 60 points or more in full point of 70 and so a substantial improvement was made as compared with 36.7 point in the comparison example. Comparison between the samples A to C and the samples D to F showed that a slight better result was indicated if a first pouring of salt was performed, and this result was a slight one, so that no conclusion was made about which sample was good. Due to the fact that the samples B and E have a relative better result, even though salt and sodium bicarbonate are not added much, superior results can be attained.

As a result of observation of color, shape holding characteristic and occurrence of drip in the sliced fish flesh, the comparison product showed a yellowish red color and the products of the present example showed a transparent red color which is similar to a color of rainbow salmon. Although flesh of the comparison example was soft and relaxed and after being sliced into pieces, the cut flesh could not be set vertical on a tray, the product of the present example could be stood up one by one on a tray and the sliced flesh pieces were quite resilient. Further, as to the drip, it was scarcely produced in the product of the present embodiment, and it was produced in such a degree as one in which moisture sparkled at the cut plane. Even after being left at a room temperature and elapsed for 7 hours, no change was acknowledged in the aforesaid results of observation. To the contrary, occurrence of drip was acknowledged in the sample of comparison.

EXAMPLE 24

A large-sized bonito was prepared, its head and internal organs were removed, this flesh was cut into three pieces with skin and a fillet of bonito of 900 g was prepared. Solution in 4.0 mol concentration of 45 cc having salt dissolved therein was injected against this bonito of 900 g in a net-like form and an aging of the salt dissolution was promoted while a vibration was being given for 5 minutes to the flesh with an electric massage machine.

Then, solution in 2.0 mol concentration of 42 cc having $NaHCO_3$ dissoluted therein was injected against the flesh in a net-like form, a salt dissolution and aging promotion of gelation and emulsifying capability were performed while a vibration was being given to the flesh for 5 minutes with an electric massage machine.

In addition, solution having sweet sake of 15 cc, cooking sake of 15 cc, cane sugar of 12 g, mixture of 1.5 g of vitamin C and vitamin E mixed and dissolved therein was injected against the aforesaid processed fillet of bonito in a net-like form, and uniform impregnating and aging of the additive substance were promoted while a vibration was being given to the flesh for 5 minutes with an electric massage machine.

(1) Middle bones of the central bloody part of the semi-fillet of bonito got by the aforesaid processing were removed, skin was peeled off and the flesh was sliced into rectangular pieces. Back part was frozen, vacuum packaged and stored in a refrigerator. Berry part was applied for a sliced piece as it was and taste test was performed. As a result, it was made apparent that a Toro of the bonito was soft and had a taste of melting-like touch in the mouth. The frozen rectangular piece stored in its frozen state was thawed after one month, no drip was generated and also although a taste test was carried out, the flesh could be eaten.

(2) Middle bones in the central bloody flesh in remained half fillet flesh of the aforesaid bonito were cut and removed, the flesh was pierced with a stick together with its skin, an entire surface was roasted for 30 seconds with a gas cooking device, then the flesh was cooled with ice and water at once to get a cut and crushed bonito. The back part was frozen, vacuum packaged and stored in a freezer. Although the berry part was cut and crushed and a taste test was performed for the berry part, it was made apparent that the flesh could be eaten deliciously without any taste seasoning as it was. In addition, the frozen cut and crushed flesh stored was thawed after one month, a taste test was performed and the flesh could be eaten deliciously in the same degree as that before freezing. In view of this fact, it was made apparent that the flesh could be set in a commercial distribution channel as frozen cut and crushed bonito.

EXAMPLE 25

A fresh Mongoh cuttlefish was got, its legs and berry were separated from each other, its internal organs were removed and a body flesh was opened. Skins at both surfaces of this Mongoh cuttlefish were pierced with needles of 1.0Ø in a spaced apart distance of about 10 mm, holes were opened, 300 g of the flesh cut into one with a width size of about 20 mm was set in a vacuum mixer. Solution in 6.0 mol concentration of 11.6 g having NaCl dissolved in water was mixed with solution in 1.0 mol concentration of 25.8 g having $NaHCO_3$ dissolved in water, further solution having sweet sake of 5 g and GCR of 1 g was prepared. The vacuum mixer was rotated at a low speed rotation while its pressure was being reduced to 70 mmHg, prepared solution was atomized, added, dispersed and absorbed in the flesh, and after elapsing of one minute, the pressure was returned back to its normal pressure, the operation was terminated and the processing was completed.

The processed Mongoh cuttlefish was stored in a refrigerator for 3 days, taken out, the half of it was vacuum packaged and frozen. The remained half flesh was roasted and cooked as Tempura, ten panelists evaluated the flesh, and all these panelists evaluated that the flesh was soft and delicious. The frozen processed product was thawed after one month, roasted and cooked as Tempura, ten panelists evaluated the product, resulting in that they showed a substantial same evaluation as that of the fresh fish. The thawed product did not produce any drip and no splashing of oil did not be observed even in the case that the flesh was fried in Tempura.

It was also made apparent that a similar effect could be obtained even in the case that the flesh body was opened, solution was atomized at both surfaces of the Mongoh cuttlefish having pierced holes opened therein.

EXAMPLE 26

Frozen Black Tigers (shrimp) with heads being removed (with shells) were taken and they were thawed while their temperatures were being monitored. 600 g of the Black Tigers with their heads removed were put in the vacuum mixer.

Solution in 6.0 mol concentration of 23.2 g having NaCl dissolved in water was mixed with solution in 1.0 mol of 51.6 g having $NaHCO_3$ dissolved in water, and further sweet sake of 10 g and GCR of 2 g were added to prepare solution. The vacuum mixer was rotated at a low speed while its pressure was being reduced to 70 mmHg, the prepared solution was atomized, added, dispersed and absorbed, after elapsing one minute, the pressure was recovered to the normal pressure, the operation was terminated and the processing was completed.

The processed Black Tigers were stored in a refrigerator for one day, taken out, the half of them was vacuum packaged and frozen. Some of the remained half flesh were boiled, and ten panelists evaluated the flesh. Some of the flesh were peeled off shells, opened and cooked as Tempura and ten panellists evaluated the flesh. All these panelists evaluated that the flesh was soft and delicious. The frozen processed product was thawed after one month, similarly boiled and cooked in Tempura and the ten panelists evaluated them and showed the same evaluation as that for the non-frozen flesh. In particular, it was made apparent that specific smell of the boiled shrimp was diminished. It was also made apparent that a similar effect could be obtained in this process even in the case that the shrimps with shells being peeled off and boiled were processed.

[Industrial Applicability]

As described above, according to the present invention, the following effects can be attained.

(1) It is possible to realize the processed fish flesh composed of only high nutritious fish flesh having a high yield in which a small amount of high concentrated salt and alkali or the like is mainly added to marine products, they are processed in a quite short period of time (1 to 15 minutes), the skeletal muscles or layers of fat can be improved by a bio-chemical processing for the flesh tissue of the marine product, the number of type of or an amount of use of additive agents can be reduced, the flesh is soft and shows a superior binding characteristic without using various kinds of binding agents, a high heat binding characteristic is indicated without applying a forced pressing against the layer of fat or flesh, the flesh becomes a sheet of flesh, even if the flesh is cut with a fork or a knife, the flesh is not separated, but it shows a superior resiliency, its processing can be freely attained, a denaturation loss is prevented, a low molecular nutritious substance such as drip is effectively utilized.

(2) Solution containing a small amount of high concentrated salt and alkali, vitamins is added, cell membranes, myofibrils, perimysium, collagen or lipid, fat, cell membranes or collagen in fat, or skeletal muscles or fat tissues are relaxed or the flesh tissues are dissolved in salt to improve it into fine net-like texture, so that taste can be pulled from a cellular level, the taste can be enjoyed more continuously the more the flesh is bitten after eating raw fish state or after cooking it, and various seasoning agents can be added and the taste not found in the prior art product can be given under a complex formation of taste. The most preferable product can be cooked conveniently by an electrical cooking device such as a micro-wave oven, it is possible to realize the fish flesh material in which a small amount of moisture is produced during heating, taste can be kept in the flesh and vividly be utilized.

(3) A flesh color fading caused by oxidation during refrigerating of fish flesh is prevented, flesh color is vividly generated, drip caused by the thawing is prevented from being flowed out, its denaturation during refrigeration and freezing or the like is prevented. In addition, fish smell of the marine product can be diminished, protein in the tissue, fat, wax substance in fat are improved in gelation or emulsification process, the flesh is stabilized, resistance against the teeth is improved, flesh tissue is improved, the flesh is processed into flexible fish flesh well adapted in biting at a mouth, decay in the shape of the flesh can be prevented during heating or its utilization time and a degree of softness of the fish flesh can be freely adjusted.

In addition, it is possible to realize a method for manufacturing a processed fish flesh in which even if the frozen food, it can be manufactured as one having a more superior high quality than that of chilled food, a rapid freezing is carried out after processing, thawed at the time of selling, the food can be sold in its chilled state, even if the product is frozen again at a home, no problem occurs in its quality, its processed product is superior in preservation, resulting in that a new type of frozen food suitable for a characteristic in distribution system can be manufactured in high productivity and in mass production.

TABLE 1

HOKI

| Sample | Raw fish | Burned product yield (average value) (%) | | | Non-coat fried food yield (average value) (%) | | |
|---|---|---|---|---|---|---|---|
| | | just after cooking | after 2 hours | after 20 hours | just after cooking | after 2 hours | after 20 hours |
| Example | 300 g 50 g × 6 pcs | 89.8 | 84.2 | 80.9 | 90.7 | 87.9 | 83.7 |

TABLE 1-continued

HOKI

| Sample | Raw fish | Burned product yield (average value) (%) | | | Non-coat fried food yield (average value) (%) | | |
|---|---|---|---|---|---|---|---|
| | | just after cooking | after 2 hours | after 20 hours | just after cooking | after 2 hours | after 20 hours |
| Comparison example | 300 g 50 g × 6 pcs | 82.6 | 71.1 | 67.3 | 76.9 | 69.2 | 66.3 |

TABLE 2

SPEAFISH TUNA

| Sample | Raw fish | Retort and canned foods | | Micro-wave processed foods | |
|---|---|---|---|---|---|
| | | after heating | yield | after heating | yield |
| Example | 300 g 50 g × 6 pcs | 240.0 g | 80.0% | 216.0 g | 72.0% |
| Comparison example | 300 g 50 g × 6 pcs | 199.5 g | 66.5% | 157.5 g | 52.5% |

TABLE 3

| Class | I liquid | II liquid |
|---|---|---|
| A | 11.6 g of NaCl solution in 6.0 mol concentration (salt of 1.0 weight parts) | 25.8 g of NaHCO$_3$ solution in 1.0 mol concentration (sodium bicarbonate 0.67 weight parts) |
| B | 10.6 g of NaCl solution in 4.0 mol concentration (salt of 0.67 weight parts) | 25.3 g of NaHCO$_3$ solution in 0.75 mol concentration (sodium bicarbonate 0.5 weight parts) |
| C | 9.6 g of NaCl solution in 2.0 mol concentration (salt of 0.33 weight parts) | 24.8 g of NaHCO$_3$ solution in 0.5 mol concentration (sodium bicarbonate 0.33 weight parts) |
| D | 25.8 g of NaHCO$_3$ solution in 1.0 mol concentration | 11.6 g of NaCl solution in 6.0 mol concentration |
| E | 25.3 g of NaHOC$_3$ solution in 0.75 mol concentration | 10.6 g of NaCl solution in 4.0 mol concentration |
| F | 24.8 g of NaHOC$_3$ solution in 0.5 mol concentration | 9.6 g of NaCl solution in 2.0 mol concentration |
| G | Non additive | Non additive |

TABLE 4

| | A | B | C | D | E | F | G |
|---|---|---|---|---|---|---|---|
| (1) Color | 9.6 | 9.9 | 9.6 | 9.7 | 10.0 | 9.7 | 7.2 |
| (2) Shape holding state | 9.5 | 10.0 | 9.3 | 9.2 | 9.4 | 9.2 | 4.5 |
| (3) Occurrence if drip | 9.8 | 9.8 | 9.5 | 9.8 | 9.5 | 9.3 | 4.3 |
| (4) Resiliency | 8.8 | 9.1 | 8.5 | 8.4 | 8.7 | 8.3 | 4.7 |
| (5) Taste | 9.0 | 9.5 | 9.3 | 9.3 | 9.4 | 9.4 | 5.8 |
| (6) Outer appearance of burned foods | 7.9 | 8.0 | 7.7 | 7.7 | 7.7 | 7.7 | 6.2 |
| (7) Taste of burned foods | 9.0 | 10.0 | 9.2 | 92 | 9.7 | 9.0 | 4.0 |
| Total | 63.6 | 66.3 | 63.1 | 63.3 | 64.4 | 62.6 | 36.7 |

We claim:

1. A processed fish flesh consisting essentially of 100 parts by weight of a block of fish flesh or fine cut fish flesh; a salt of 0.2 to 4 parts by dry weight, said salt being any one of NaCl, KCl, $CaCl_2$, and $MgCl_2$ or a mixture thereof and being dissolved in water or drip of raw fish flesh or other fish flesh, or a mixture of the drip thereof and water in a mole concentration of 1.5 to 7.0; and an alkali of 0.1 to 2.7 parts by weight, said alkali being any one of $NaHCO_3$, $NA_2CO_3$, $KHCO_3$, $K_2CO_3$, $NH_4HCO_3$, or a mixture thereof and being dissolved in water or drip of raw fish flesh or other fish flesh or a mixture of the drip thereof and water in a mole concentration of 0.3 to 3.0.

2. A processed fish flesh according to claim 1, further consisting essentially of one or more alcohols totaling 0.5 to 12 parts by weight, vitamin E of 0.001 to 0.2 parts by weight, vitamin C of 0.006 to 0.3 parts by weight, saccharide of 1 to 13 parts by weight, albumen of 0.2 to 5 parts by weight and antioxidant of 0.001 to 4 parts by weight parts by weight.

3. A processed fish flesh according to claim 2, further consisting essentially of a material selected from at least one of the following groups:

a bond reinforcing agent selected from the group consisting of soybean protein powder, dextrin and casein, and soda;

an emulsifying agent selected from the group consisting of albumen, lecithin and sugar ester;

a functional agent selected from the group consisting of DHA, EPA, chitosan, calcium, vitamin and collagen;

an adhesion reinforcing agent selected from the group consisting of sodium alginate, calcium citrate, corn starch, potato starch powder and glucomannan;

a preservation agent selected from the group consisting of sorbic acid and potassium sorbate;

plant fiber or animal fiber selected from the group consisting of soy bean protein fiber and chitin;

animal and plant fat selected from the group consisting of coconut oil, corn oil, rape oil, lard and fish oil;

seasoning selected from the group consisting of glycine, L-glutamic acid, sodium glutamate, disodium inosinate, disodium guanylate, fish peptide, beef powder, beef extract and pork extract; and spice selected from the group consisting of pepper, ginger, paprika, nutmeg, mace, thyme, allspice, onion, garlic, coriander, cardamom, caraway, sage, laurel, marjoram, clove and cinnamon.

4. A processed fish flesh according to claim 1, wherein the drip of raw fish flesh is returned into the block of fish flesh or the fine cut fish flesh.

5. A processed fish flesh according to claim 1, further comprising a material from the group consisting of:

a bond reinforcing agent from the group consisting of soybean protein powder, dextrin and casein, and soda;

an emulsifying agent from the group consisting of albumen, lecithin and sugar ester;

a functional agent from the group consisting of DHA, EPA, chitosan, calcium, vitamin and collagen;

an adhesion reinforcing agent from the group consisting of sodium alginate, calcium citrate, corn starch, potato starch powder and glucomannan;

a preservation agent from the group consisting of sorbic acid and potassium sorbate;

plant fiber or animal fiber from the group consisting of soy bean protein fiber and chitin;

animal and plant fat from the group consisting of coconut oil, corn oil, rape oil, lard and fish oil;

seasoning from the group consisting of glycine, L-glutamic acid, sodium glutamate, disodium inosinate, disodium guanylate, fish peptide, beef powder, beef extract and pork extract; and spice from the group consisting of pepper, ginger, paprika, nutmeg, mace, thyme, allspice, onion, garlic, coriander, cardamom, caraway, sage, laurel, marjoram, clove and cinnamon.

6. A method of preparing processed fish flesh, consisting essentially of:

a salt treatment step wherein 100 parts by weight of fish flesh is immersed in a salt solution of 3 to 12 parts by weight of a salt in a mole concentration of 1.5 to 7.0 and the salt is from the group consisting of NaCl, KCl, $CaCl_2$, and $MgCl_2$, and a mixture thereof; and an alkali impregnation step for impregnating the fish flesh with an alkali solution of 1 to 10 parts by weight of an alkali in a mole concentration of 0.5 to 3.0, the alkali being from the group consisting of $NaHCO_3$, $Na_2CO_3$, $KHCO_3$, $K_2CO_3$, $NH_4HCO_3$, a mixture thereof.

7. A method of preparing processed fish flesh according to claim 6, wherein the salt treatment step is carried out before or after or together with the alkali impregnation step.

8. A method of preparing processed fish flesh according to claim 6, further consisting essentially of an additive treatment step for impregnating the fish flesh with an additive from the group consisting of saccharide, vitamins, animal and plant protein powder and antioxidant.

9. A method of preparing processed fish flesh according to claim 6, wherein the alkali solution further contains at least one of saccharide, vitamins, animal and plant protein powder and antioxidant.

10. A method of preparing processed fish flesh according to claim 6, further consisting essentially of a dispersion and absorption step for impregnating the fish flesh with the solution of the salt and/or the alkali with or without the additive and dispersing the solution thereof in the fish flesh after the salt treatment step or the alkali impregnation step.

11. A method of preparing processed fish flesh according to claim 10, wherein the dispersion and absorbing step is carried out by any one of a massage process, a vibration process, an ultrasonic wave process and a kneading process.

12. A method of preparing processed fish flesh according to claim 6, wherein at least one of the salt and the alkali is dissolved in water or drip of raw material fish flesh or other fish flesh or a mixture thereof.

13. A method of preparing processed fish flesh according to claim 6, wherein the salt treatment step or the alkali impregnation step is carried out at a temperature of 20° C. or less and/or a pH value of 5 to 10.

14. A method of preparing processed fish flesh according to claim 6, wherein the salt treatment step or the alkali impregnation step is carried out by injecting or atomizing the salt solution or the alkali solution, respectively, into or onto the fish flesh.

15. A processed fish flesh according to claim 1, wherein the salt is added in an amount of 0.2 to 4 parts by weight and the alkali is added in an amount of 0.3 to 2 parts by weight, with respect to 100 parts by weight of the fish flesh.

16. A processed fish flesh according to claim 15, wherein the salt is added in an amount of 0.5 to 2 parts by weight and the alkali is added in an amount of 0.4 to 1.3 parts by weight, with respect to 100 parts by weight of the fish flesh.

17. A processed fish flesh according to claim 1, wherein the salt is contained in a mole concentration of 2.5 to 6.0 and the alkali is contained in a mole concentration of 0.7 to 2.5.

* * * * *